United States Patent
Polizzi et al.

(10) Patent No.: US 6,643,661 B2
(45) Date of Patent: Nov. 4, 2003

(54) METHOD AND APPARATUS FOR IMPLEMENTING SEARCH AND CHANNEL FEATURES IN AN ENTERPRISE-WIDE COMPUTER SYSTEM

(75) Inventors: Kathleen Riddell Polizzi, Los Gatos, CA (US); Gail Helen Godbeer, Vancouver (CA); Gadi Yedwab, Seal Beach, CA (US); Shuhong Chen, Cupertino, CA (US); Robert Mark Bick, Beavercreek, OH (US); Jack Norris, San Jose, CA (US)

(73) Assignee: Brio Software, Inc., Santa Clara, CA (US)

( * ) Notice: Subject to any disclaimer, the term of this patent is extended or adjusted under 35 U.S.C. 154(b) by 340 days.

(21) Appl. No.: 09/845,030

(22) Filed: Apr. 27, 2001

(65) Prior Publication Data

US 2002/0023158 A1 Feb. 21, 2002

Related U.S. Application Data

(60) Provisional application No. 60/200,090, filed on Apr. 27, 2000.

(51) Int. Cl.[7] .............................................. G06F 17/30
(52) U.S. Cl. .......................... 707/100; 707/101; 707/1
(58) Field of Search ................................ 707/100, 101, 707/102, 10, 2, 3, 103, 1; 709/201, 203

(56) References Cited

U.S. PATENT DOCUMENTS

| | | | |
|---|---|---|---|
| 5,832,450 A | * 11/1998 | Myers et al. .................. 705/3 |
| 5,884,299 A | 3/1999 | Ramesh et al. ................ 707/2 |
| 5,926,818 A | 7/1999 | Malloy | |
| 5,983,227 A | 11/1999 | Nazem et al. ................. 707/10 |
| 5,991,756 A | 11/1999 | Wu ............................... 707/3 |
| 6,032,144 A | 2/2000 | Srivastava et al. ............. 707/3 |
| 6,078,926 A | 6/2000 | Jensen et al. ................ 707/103 |
| 6,088,717 A | * 7/2000 | Reed et al. ................... 709/201 |
| 6,205,469 B1 | 3/2001 | Graham ........................ 709/203 |
| 6,212,524 B1 | 4/2001 | Weissman et al. ........... 707/101 |

FOREIGN PATENT DOCUMENTS

| | | | |
|---|---|---|---|
| WO | WO9857276 A | 12/1998 | G06F/17/30 |
| WO | WO9916198 A | 4/1999 | H04J/3/14 |
| WO | WO 99 57658 A | 11/1999 | G06F/17/30 |
| WO | WO 00 20982 A | 4/2000 | G06F/15/16 |

OTHER PUBLICATIONS

Carickhoff, R: "A New Face for OLAP", Internet System, 'Online! Jan. 1997, pp. 1–10, Retrieved from Internet <URL:http://www.dbmsmag.com/7901i08.html>.

Kiekebusch, M. et al.: "Automatic Report Generator Paranal Observatory", Advanced Telescope and Intrumentation Control Software, Munich, Germany, Mar. 29–30, 2000, vol. 4009, pp. 308–316.

Slomka, P.J. et al.: "Java–based PACS and Reporting System for Nuclear Medicine" Medical Imaging 2000: Pacs Design and evaluation: Engineering and Clinical Issues, San Diego CA Feb. 15–17, 2000 vol. 3980 pp. 235–241.

Yedwab, G.: "L'Evoluton des Generateurs de Repports" Genie Logiciel, Genie Industriel Multimedia, Paris, France, No. 45, Sep. 1997, pp. 43–49.

Whitehead, N.: "A New Era of Information Sharing", Enterprise Middleware, May 1998, Xephon, UK, pp. 26–30.

Ewbank, K.: "Reports Cracked Report Generators", Developer Network Journal, Nov.–Dec. 1999, Matt Publishing, UK, No. 15, pp. 26–27, 29–32.

* cited by examiner

Primary Examiner—Sanjiv Shah
(74) Attorney, Agent, or Firm—Baker & McKenzie

(57) ABSTRACT

Disclosed is a portal computer system and method which provides personalized portal pages on which searches can be entered and search reports can be dynamically reported.

49 Claims, 11 Drawing Sheets

Fig. 7
Repository Properties
| Name | Repository | Host | DB Type | DB Server | | | ... |
|---|---|---|---|---|---|---|---|
700
Authentication Server Properties
| Name | Authentication Server | Host | DB Type | DB Server | Capabilities | Drivers | ... |
|---|---|---|---|---|---|---|---|
705
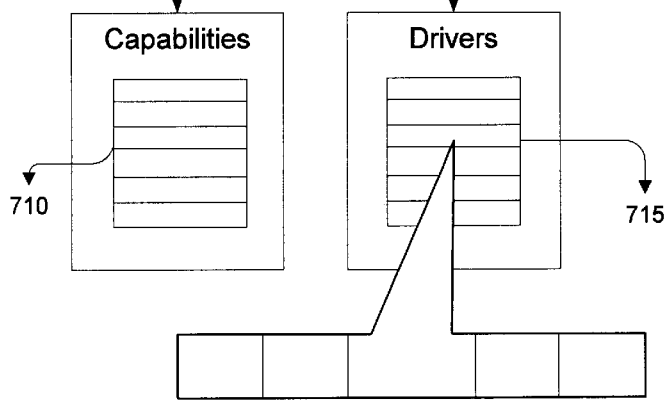
Job Server Properties
| Name | Job Server | Host | DB Type | DB Server | Application | Program | ... |
|---|---|---|---|---|---|---|---|
720   725
| Job Server Class | SQR Server | ... |
|---|---|---|
730   735
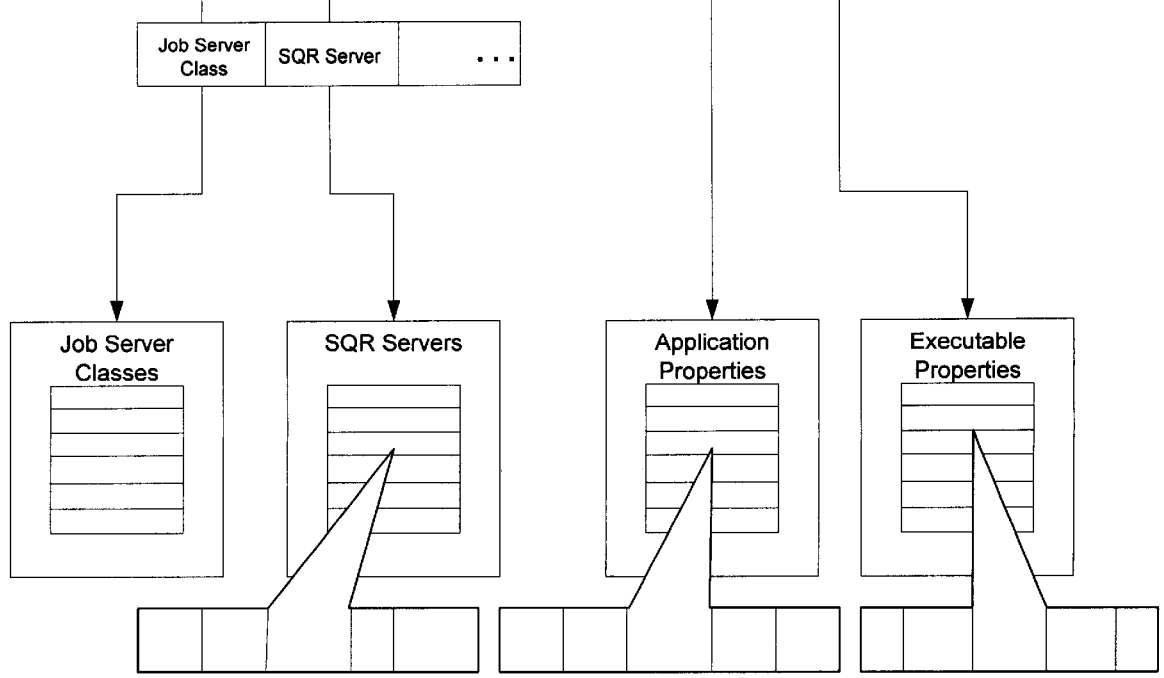

Miscellaneous
Merchandise

Parameters      *Initialize using parameter list:* [Publisher Defaults ▼] Edit

What sales information are you interested in?

Select a Sales Region: [Northern ▼] ← 1100

Select a Quarter:   ● Q1   ○ Q3
                ○ Q2   ○ Q4 ← 1105

What style chart would you like?

Select a Chart Style: [Bar ▼]

Show in:   ● 3 Dimensions ← 1110
         ○ 2 Dimensions ← 1115

1130
                                      ☐ Save as My Defaults

1120 ← [■] [■] ---- 1125

METHOD AND APPARATUS FOR IMPLEMENTING SEARCH AND CHANNEL FEATURES IN AN ENTERPRISE-WIDE COMPUTER SYSTEM

RELATED APPLICATIONS

This application depends from and claims priority to U.S. Provisional Patent Application No. 60/200,090, filed Apr. 27, 2000, which is hereby incorporated by reference. This application is cross-referenced to related co-pending U.S. application Ser. Nos. 09/845,057 filed Apr. 27, 2001, 09/844,715 filed Apr. 27, 2001 and PCT Application Serial No. PCT/US01/13842 filed Apr. 27, 2001.

BACKGROUND

Many businesses and other enterprises use a variety of computer systems that are specially adapted for certain purposes. For example, a manufacturing division of an enterprise may use one kind of computer system specifically designed to handle manufacturing data while the sales division of the same enterprise may use another kind of system for sales information. The engineering division of the enterprise may use an entirely different computer system as well. Using different computer systems for different divisions of an enterprise makes sense because each kind of computer system will provide certain strengths that suit that division.

Although different divisions within an enterprise may use different computer systems, there are advantages to sharing data across an entire enterprise. For example, an individual in the sales division may need to know the current inventory levels for a product in the manufacturing division to determine what price should be set for the product. One solution to this problem is to provide hard copies of reports from different divisions of an enterprise to certain key individuals in the enterprise. This procedure is disadvantageous because it can overwhelm an individual with much more information than the individual needs and because the data in the hard copies of the report can be out of date by the time that the individual reviews it. Another solution to this problem is to use emulator computers that allow an individual to use a single computer to access more than one computer system. This procedure is also disadvantageous because the individual is required to learn a new interface and a new computer language for each computer system that he is to access. Thus, there is a need for an enterprise-wide computer system that can connect to a variety of computer systems, retrieve data from these systems, and present data to an individual in a standardized, easy-to-learn format.

SUMMARY

Disclosed herein is an enterprise-wide computer system designed to be connected to a variety of different computers systems within the enterprise. The computer system uses a portal architecture to allow a user to view a wide variety of content retrieved from a variety of different computer systems. The computer system may also be referred to as a portal system. The portal system is configured such that a plurality of users can access the system at the same time through a computer network such as the Internet. The portal system may also be connected to one or more back-end databases that correspond to the different computer systems within the enterprise. The portal system is scalable because many of its components are modular and can be readily duplicated as redundant processors. In this manner, small enterprises and large enterprises may be accommodated by different versions of the same portal system. In one aspect, the portal system acts as a middle-ware program that converts the data and reports from the variety of back-end databases and presents the data to a user in a standardized format. Data is provided to users by the portal system in a format that is readable by a browser program. Thus, by allowing a user to use a standard browser program as a user interface, the user's learning curve for the portal is greatly reduced. In particular, the user will be able to select reports and data for viewing by pointing at an item with his mouse and selecting a hyperlink.

In addition to converting data from back-end databases into a standardized format for a user, the portal system may be configured to ran predefined jobs to process data. These jobs are stored within the portal system in a computer memory device called a repository. These jobs can perform a variety of tasks such as retrieving data from a back-end database, preparing a report based upon retrieved data, processing data already resident within the portal system, or notifying a user when a particular condition occurs within the portal system. These jobs can be executed on a pre-defined schedule or on an ad-hoc basis at the request of a user. When a job is executed on a predefined schedule, the output report of the job will often be stored in the repository so that it can be retrieved at a later time. When a job is performed on an ad-hoc basis, the output report will generally be provided to the user immediately through his browser interface. If a job is of particular interest to a user, then the portal system allows a user to subscribe to the job. A subscription will send a notification to the user whenever the job is executed by the portal system. The portal system also allows a user to configure one or more exception conditions for a job that indicate when some element of the output report is outside of a predefined range. A user can subscribe to job exceptions and thus be notified when these exceptions occur.

The portal system presents data to a user in an object called a portal page. The portal page is an object arranged in a format that is readable by a browser program. The portal page is a highly configurable document that may be comprised of a plurality of modules called portal objects. Each portal object may contain a set of links corresponding to output reports, jobs, or other objects stored within the repository. Thus, by clicking on one of the links in a portal object, the portal system will process the object corresponding to that link. If the link is directed to a job stored within the portal system, then clicking on that job will cause the job to be executed. If the link is directed to a browsable object stored within the repository, then that object will be displayed to the user. A portal page may also include a display window that can display browsable objects to a user. Another feature of the portal page is a dynamically updated portal object. A dynamically updated portal object is an object that is updated on the user's portal page based upon data stored in the portal system. If a dynamically updated portal object is included within a user's portal page, the user may receive the latest information corresponding to that object by refreshing his portal page. For example, if the dynamically updated portal object is linked to the output report of a job, then the portal object will display the latest version of the output report to the user when the portal page is refreshed. A dynamically updated portal object may also be hyperlinked to its corresponding object in the portal system such that a user may view, edit, or execute the corresponding object by clicking on the dynamically updated portal object at the user interface.

Each user's portal page may be customized to suit that user's specific needs. A user may add or remove portal objects from his portal page at his discretion. A user may also edit some portal objects in order to add links to reports or objects that the user is interested in. Another way in which a user can customize his portal page is to add and modify "favorites" on the portal page. A user's favorites is a set of links to objects stored in the repository, on an intranet, or on the Internet. These objects may be jobs, reports, or any other kind of data. By clicking one of these links, the corresponding object is presented in the display window.

The portal system may also be configured to conduct searches on behalf of a user. The portal system provides the ability to search both structured data (databases, XML, formatted text, etc.) and unstructured data (HTML files, web-based content, PDF files, etc.) at locations inside and outside the portal. The portal system 120 also allows the user to configure the searches so that only certain objects, in certain locations are searched. By using these search parameters, a user can streamline a search to identify only highly relevant data. This increases the efficiency of the search and reduces the likelihood of identifying undesired results. If a user constructs a search that produces particularly relevant results, then the user may save those search parameters as a channel. The user can return to this channel at a later date to conduct the same search to see if any new objects have been identified. A list of channels stored by a user may be included in a user's portal page, allowing him access to search results by simply clicking on the appropriate channel link.

DESCRIPTION OF THE DRAWINGS

FIG. 7 depicts some of the properties associated with a repository, an authentication server, and a job server residing in the portal.

DETAILED DESCRIPTION

Disclosed herein is a method and apparatus for implementing an enterprise-wide portal system. The system is designed to connect a plurality of users to the portal system so that the users can access and process data that is stored therein. The system may also be connected to one or more back-end databases so that a user can view, and process data that is stored therein. In one embodiment of the portal, a variety of back-end databases using different operating systems are connected to the portal system. In this manner, the portal system allows a user to access data from a wide variety of back-end databases with a single computer interface. Another described aspect uses the portal system as a middle-ware program for converting a user's instructions into commands to retrieve and process data from the back-end databases. Another described aspect uses the portal system to display the results of a back-end process to the user in a format that can be read by a standard browser program. Another described aspect uses the portal system to process data that is stored in the portal system and provide output reports to a user. The portal system thus provides a one-stop interface for accessing, processing, and providing a wide variety of data to a plurality of users. In order to simplify the access to the computer system, the user interface may be based upon a standard browser program that is capable of reading Hypertext Markup Language (HTML). The browser may also be capable of reading other web-based programs such as Java, XML, Macromedia Flash, or other languages. By using a standardized browser program as a user interface to the computer system, the user is presented with a familiar format in which a user can point and click on hypertext links to navigate through the portal system and provide instructions to the portal system.

Figure 1:
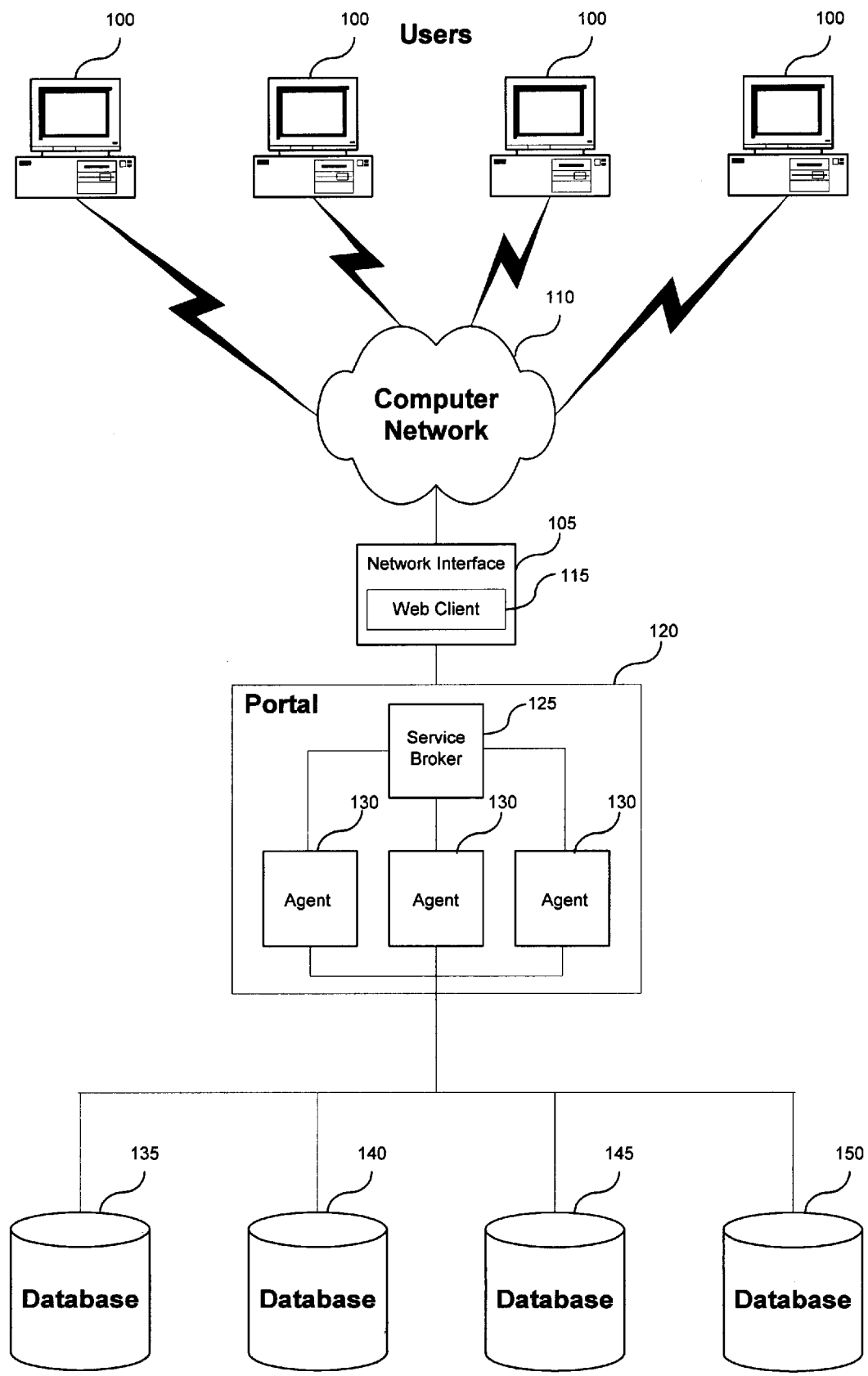
FIG. 1 depicts a high level view of the portal system connected to a plurality of back-end database and to a plurality of users.

FIG. 1 depicts a high-level illustration of one embodiment of the portal system 120. In FIG. 1, a plurality of users 100 are connected to a network interface 105 through a computer network 110. The computer network 110 can take many forms including a direct connection, a local-area network, an enterprise intranet, a wireless network, the Internet, or any combination thereof. The network interface 105 is connected to a portal system 120 through a web client 115. Within the portal system 120 are a service broker 125 that controls access to the computer system and a plurality of service agents 130 that are configured to perform specific tasks within the portal system 120. Also connected to the portal system 120 are several back-end databases 135, 140, 145, 150 in which data is stored. It should be noted that FIG. 1 is a block diagram that represents certain functional aspects of the invention as separate blocks. These functional blocks may be implemented on separate computer platforms or on the same computer platform.

In FIG. 1, each of the back-end databases 135, 140, 145, 150 may contain different kinds of data and may use different operating system platforms. For example, back-end database 135 could be a Unix-based system in which statistical process control information about a manufacturing facility is stored. Back-end database 140 could be a PC-based database in which human resources data (employee payroll, headcount, organizational structure, etc.) is stored. Back-end database 145 could be an Oracle-based system in which sales and inventory information is stored. Lastly, back-end database 150 could be a Windows NT server in which benefits and pension information is stored. Different databases and platforms are sometimes used for different groups within an enterprise because each group has specialized needs that are best served by their respective back-end databases. Using different databases and platforms within the same enterprise, however, makes the combination and comparison of data from different groups difficult. The embodiments disclosed herein address this difficulty by using the portal system 120 as a common interface between the various back-end databases 135, 140, 145 & 150 and a user 100. By using the portal system 120 as a common interface, data can be retrieved from the back-end databases and presented to the user in a standardized format through the web client 115. For example, a user 100 may request that the portal system 120 produce a graph illustrating the enterprise's manufacturing yield over the past year. Upon receiving the request, the portal system 120 would retrieve yield data from manufacturing back-end database 135 and process that data to generate a bar chart corresponding to the user's request. This bar chart would then be presented to the user 100 through his browser program. That same user 100 may also request, during the same session, an update of the sales figures for the enterprise for the current month. The portal system 120 would retrieve sales data from the sales back-end database 145, process that data, and generate a figure corresponding to the user's request. This data would then be presented to the user 100 through his browser program. The portal system 120 has the ability to simultaneously perform each of these tasks and present this data to the user 100 with a single interface.

Figure 2:
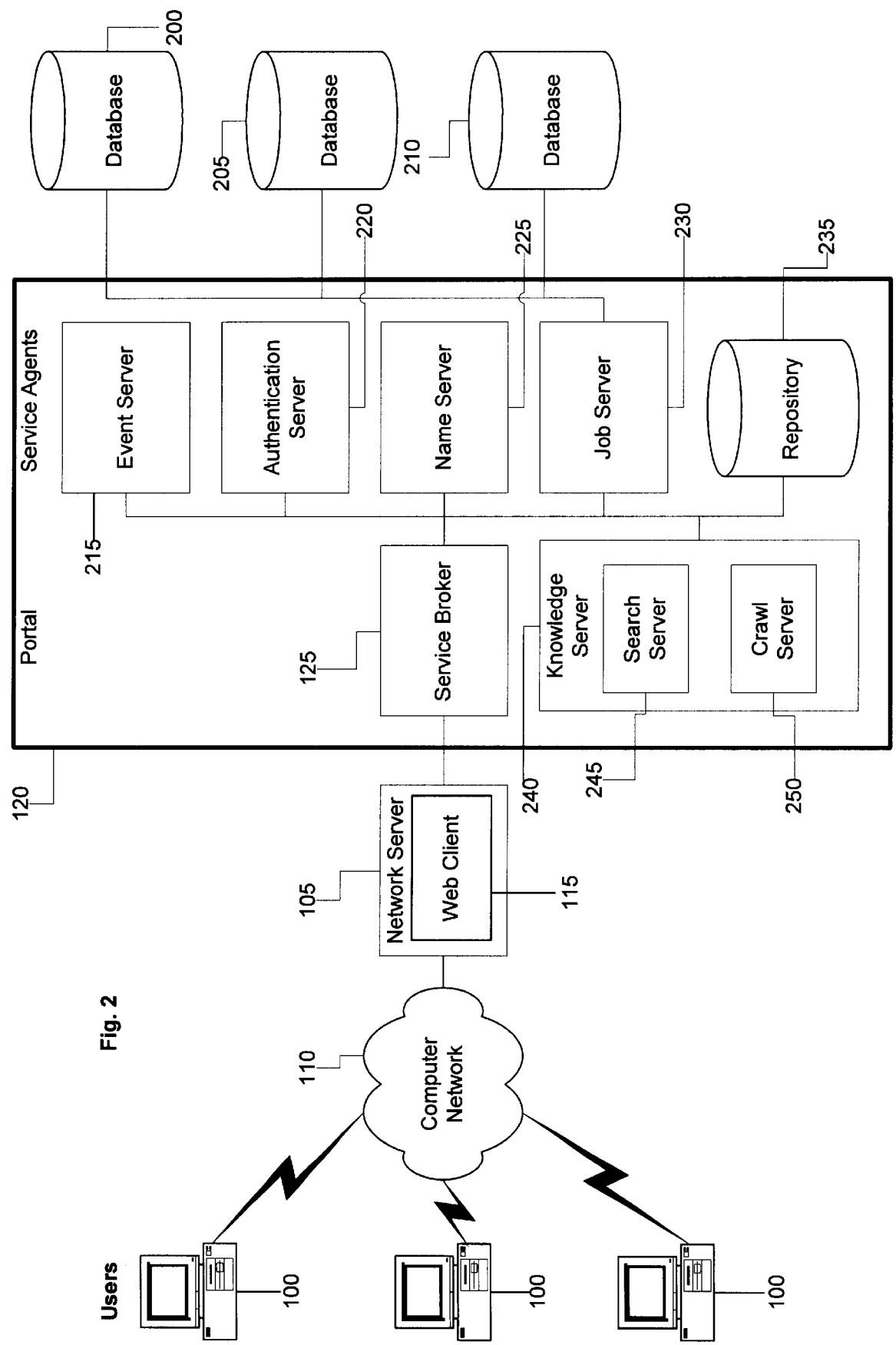
FIG. 2 depicts a lower level view of the portal system including the various service agents.

FIG. 2 discloses another embodiment of the portal system 120. In FIG. 2, a plurality of users 100 are connected to a network interface 105 through a computer network 110. A web client 115 is resident on the network interface 105 that interfaces the users to a portal system 120. Also illustrated in FIG. 2 are three back-end databases 200, 205 and 210 that are connected to the portal system 120. Within the portal system 120 are a service broker 125 and a plurality of service agents: an event server 215, an authentication server 220, a name server 225, a job server 230, a repository 235, and a knowledge server 240 that includes a search server 245 and a crawl server 250. It should be noted that FIG. 2 is a block diagram that represents certain functional aspects of the portal system 120 as separate blocks. These functional blocks may be implemented on separate computer platforms or on the same computer platform. The functions served by the service agents of FIG. 2 are summarized below.

The service broker 125 serves two functions in the portal system. It controls access to the portal system 120 by users 100 and controls the disposition of jobs to the service agents within the portal system. By controlling the disposition of jobs, the service broker 125 ensures that jobs are processed in an orderly manner and that none of the service agents become overloaded. The event server 215 schedules events, such as jobs, for processing in the portal system 120 on a predefined timetable. The authentication server 220 is used to determine if a particular user should be granted access to the portal system 120. The permissions and group memberships for a particular user are also stored in the authentication server 220. The name server 225 is the storage location for configuration information about all of the other service agents. For example, if the service broker 125 needs to know the location of a specific job server 230, then the name server 225 will provide that information to the service broker 125. The job server 230 is used to execute jobs in the portal system 120. In addition, the job server 230 can retrieve data from a back-end database 200, 205 or 210 to be processed for a particular job. Each job server 230 may be connected to at least one back-end database 200, 205 or 210 in order to retrieve data therefrom. The job server 230 may also be a stand-alone unit which process jobs that do not retrieve data from any external sources. The repository 235 is used as a storage device for all information that is to be stored in the portal system. All computer files that are stored in the repository 235 are called objects. These objects may include HTML files, job output reports, executable job files (SQL, etc.), image files, etc. Objects that are stored in the repository 235 are arranged in a hierarchy called categories. Within each category, both objects and subcategories may be stored. Categories are thus organized in a tree system much like the file system on a standard computer. In addition, each object in the repository may include more than one version. Versioning can be used to accomplish a variety of objectives including setting multiple security levels for different versions of an object, and allowing a user to see a modification history of an object. The knowledge server 250 provides the search and channel functions for the portal system 120. The knowledge server 250 is comprised of two components: a search server 245 and a crawl server 250. The crawl server 250 uses one or more crawlers to analyze and index specific information that is stored in the repository 235, a company intranet, or the Internet. A crawler can be configured to search only in certain locations in the repository 235, a company intranet, or the Internet for information to be indexed. The indices produced by the crawl server 245 are stored in the knowledge server 240 in files called information sources. Depending upon the settings of the crawl server 250, an information source will contain an index of objects found both within the portal system (i.e. in the repository 235), or outside the portal system (i.e. on an intranet or the Internet). The crawl server 250 is capable of indexing structured and unstructured data. The search server 245 uses the information sources produced by the crawl server 250 to conduct searches on behalf of a user. Because the information sources will generally correspond to specialized topics, a user may increase the efficiency of a search by selecting only those information sources that are relevant to his search. The portal system 120 can include redundant service agents for processing user requests. In this manner, the portal system 120 is scalable to handle both a small enterprise with a small number of users and a large enterprise with many redundant service agents for processing requests from thousands of users.

One aspect of the portal system 120 utilizes the various service agents to process jobs for the benefit of users. Many of these jobs can retrieve data from the back-end databases 200, 205 & 210 and process that data to generate an output report. Jobs may also be used to process data that is resident within the portal system 120. For example, jobs could include a weekly report on manufacturing statistics for the enterprise, or a report describing the current status of the enterprises' accounts receivable. Because these jobs utilize data that is retrieved directly from the back-end databases, the output reports generated by these jobs reflect an up-to-the-minute status of the corresponding aspect of the enterprise. Generally, a job is stored in the repository 235 of the portal system 120. When a job is to be executed, it is retrieved from the repository and sent to an appropriate job server 230 for processing. At the job server 230, the job is executed. Sometimes, a job will require that certain data be retrieved from a back-end database 200, 205 or 210. In many instances, jobs are written in SQL language so as to facilitate the retrieval of data from the back-end databases. After data is retrieved from a back-end database 200, 205 or 210 and processed by the job, the job will produce an output report. This output report may be stored in the repository 235 after the job is complete. An output report may also be provided directly to a user 100 through the web client 115.

Jobs may be processed by the portal system 120 on either an ad-hoc basis or on predetermined schedule. Jobs processed on an ad-hoc basis are usually executed at the request of a user 100 connected to the portal system 120. When a job is processed on ad-hoc basis, the job is first retrieved from the repository 235 and sent to an appropriate job server 230 for processing. After processing, the output report will be transmitted to the user 100 via the web client 115. The output report may be stored in the repository 235 even though it was processed on an ad-hoc basis. Jobs may also be configured to run on a predetermined schedule. Information describing these schedules is stored in the event server 215. When configuring a job to run on a predetermined schedule, the job must first be associated with a schedule in the event server 215. If there is not a pre-existing schedule in the event server 215 that matches the timetable for the job, then a new schedule can be created in the event server 215. When the designated time for a schedule arrives, the event server 215 generates a list of the jobs that have been associated with that schedule and sends that list of jobs to the service broker 125 for execution. The service broker 125 then dispatches the jobs for execution on the appropriate job server 230. The output results for each of these jobs are then sent to the repository 235 for storage.

Another aspect of the portal system 120 relates to subscriptions. A user may subscribe to a particular object or category that is stored in the repository 235. Thus, if an object or category within the repository 235 is modified, then all of the subscribing users are notified of the change. Users may also subscribe to a job such that when a job is executed, the user will be notified. If a user subscribes to a job, then he will be notified of its execution regardless of whether the job was run on a pre-determined schedule, or on an ad-hoc basis. Users may receive notification in a variety of ways including e-mail or notification on the user's portal page. The portal system may also be configured to provide a copy of the job's output report as an attachment to the notification e-mail or as an automatic update to a user's portal page.

Another aspect of the portal system 120 relates to the use of exceptions. An exception is a condition that is tied to the results of a job. An exception occurs when the output report of a job includes information that is outside of a predetermined range. Any number of exception conditions can be configured for a job. However, if any of them indicate that an exception condition exists, then the entire job will indicate that an exception condition exists. Only certain jobs within the portal system 120 can be configured to indicate an exception condition. Users can subscribe to exceptions in much the same way that they subscribe to a particular job. Thus, if the execution of a job produces an exception condition, then all of the subscribing users will be notified of the exception condition. Notification of exception conditions may also occur through e-mail or a user's portal page. A user may configure his portal page to provide a dynamically updated portal page which displays the status of an exception condition. This is called an exception dashboard.

Yet another aspect of the portal system 120 relates to the use of channels. A channel is an abstract of a search, which was constructed by a user, that has been stored in the repository for processing at a later date. Generally, a channel is a search that produces a set of highly relevant results for a user. A user can update the channel at any time to see if any other highly relevant documents have become available. The parameters for constructing the search are highly configurable by the user, thus allowing him to construct a very efficient search. In particular, the channel can be configured to search limited areas of the repository 235; a company's intranet, and the Internet for new information. A user may share his channels with other users such that they can incorporate the channels into their portal pages. A user's channels may be stored in the repository 235 with the user's other portal page data.

Figure 10:
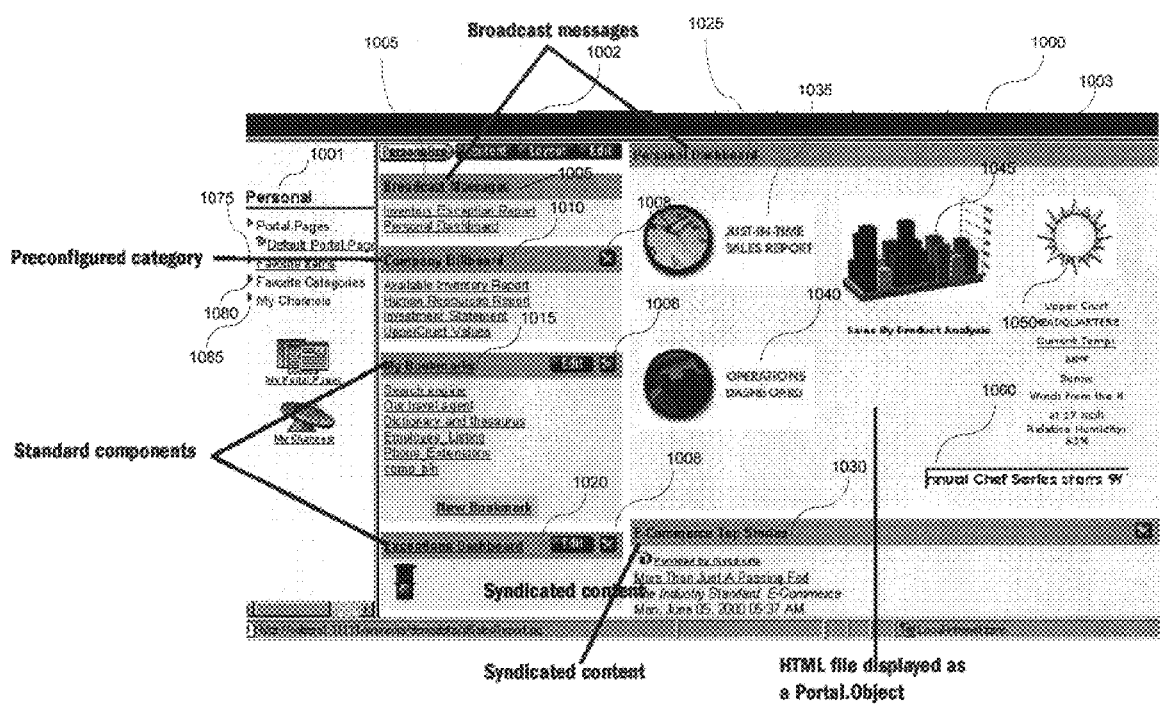
FIG. 10 depicts a representative example of a portal page as seen by a user with a browser program.

FIG. 10 depicts a representative example of another aspect of the portal system 120 called a portal page 1000. A portal page presents data to a user when he logs into the portal system 120. Because a portal page is presented to a user 100 through the web client 115, the data must be arranged in a format that is readable by a user's browser program. In FIG. 10, a wide variety of data is presented to a user 100 in the form of portal objects. A portal object is a modularized collection of links, graphics, or other data that may be presented to the user in a portal page 1000. The portal objects depicted in FIG. 10 include broadcast messages 1005, a company billboard 1010, a user's customized bookmarks 1015, an exceptions dashboard 1020, and a syndicated content object 1030. Also present in the portal page 1000 of FIG. 10 is a display window 1025. A display window 1025 is a window in the portal page 1000 in which a user 100 may view browsable objects. The display window 1025 may display a variety of objects from the repository (output reports, HTML objects, dashboards, etc.) or pages from the Internet. A user can select content to be displayed in the display window 1025 by selecting an appropriate link in the portal page 1000. The portal objects present in a user's portal page are highly configurable so that a user may customize his portal page 1000 to suit his particular needs. Some portal objects can be configured such that they must appear on every user's portal page 1000. These portal object are called mandatory portal objects. Mandatory portal objects may be used to ensure that all users 100 of the portal system 120 are presented with certain content whenever they use the portal system 120. An example of such a mandatory portal object is the broadcast messages portal object 1005 in FIG. 10. Portal objects may also be configured such that a user 100 may remove the portal object from his portal page, but cannot modify the content of the portal object. An example of this kind of portal object is the company billboard portal object 1010 of FIG. 10. In FIG. 10, it can be seen that a user 100 may remove the company billboard portal object 1010 by clicking the "X" icon 1008 in the upper right-hand corner of the object. It can also be seen that the user does not have the ability to modify the content of the company billboard 1010 because an "EDIT" icon is not present in the upper right-hand corner of the object. Portal objects may also be configured such that a user can both modify the content of the object, and remove the portal object from his portal page 1000. An example of this kind of portal object is the "My Bookmarks" portal object 1015 of FIG. 10. In FIG. 10, it can be seen that a user 100 can remove the "My Bookmarks" portal object 1015 in its entirety by clicking the "X" icon 1008 in the upper right-hand corner of the object. It can also be seen that the user can modify the content of the "My Bookmarks" portal object 1015 by clicking either of the "EDIT" icon in the upper right-hand corner of the object or the "New Bookmark" link at the bottom of the object. Thus, a user 100 can customize the content of his personal portal page 1000, by adding or removing certain portal objects or by modifying the content of certain portal objects.

Another aspect of the portal page 1000 is an exception dashboard 1020. The exception dashboard is fully configurable by a user 100, but may only be used to indicate when certain exception conditions have been met. In FIG. 10, the exception dashboard 1020 is configured to display a traffic light that is green when no exceptions are present and red when exceptions have been found. A user may add more than one indicator to the exception dashboard, such that there is a corresponding indicator for each exception condition that he has subscribed to.

A user 100 may also customize his personal portal page 1000 by using favorites and channels. If a user 100 identifies a certain object in the repository 235 that is particularly relevant to him, then that user may add the object to his Favorites. When an object is added to a user's favorites, a link corresponding to that object is added to that user's list of favorites. A user may view a list of his favorite objects by selecting the "Favorite Items" link 1075 in his personal portal window 1001. The user 100 may then view any of the listed objects in the display window 1025 by clicking on a corresponding link. A user 100 may also create a list of favorite categories in the repository by using the favorite categories link 1080 in his personal portal page 1000. In addition, a user may create a list of favorite channels by using the "my channels" link 1085 in his personal portal page.

Figure 11:
FIG. 11 depicts a representative example of an input form presented to a user during the execution of a job.

FIG. 11 depicts a representative example of another aspect of the portal system 120 called a Form. Forms allow a user 100 to provide input to a job while a job server 230 is executing the job. Because a form is presented to a user 100 through the user's browser interface, the form should be in a format that can be read by a standard browser program. Languages, which can be used to create forms, include HTML, Java, Macromedia Flash and XML. In FIG. 11, a user 100 is presented with four input fields which must be provided to the job before it can be executed: i) a sales region option 1100, ii) a quarter option 1105, iii) a chart style option 1110, and iv) a dimensions option 1115. The sales region option 1100 and the chart style option 1110 are configured as drop-down menus from which a user may select. The quarter option 1105 and the dimensions option 1115 are configured as radio buttons from which a user may select. A form may utilize a wide variety of other mechanisms to provide input to a job such as a blank text field or an image with selectable fields. Many different input mechanisms, which are known in the art of browser language programming, may be utilized here. After a user 100 has selected values corresponding to each of the input fields, the user 100 submits these values to the job server 230. In FIG. 11, this may be accomplished by pressing the "RUN" button 1120 at the bottom of the form. A user 100 may also reset the input values that have been selected to the form's default values by pressing the "RESET" button 1125 at the bottom of the form. A user 100 can also save certain input settings as the user's default values by selecting the "SAVE AS MY DEFAULTS" option 1130 in FIG. 11. When a user 100 saves certain input values as default values, these default values are stored with the user's profile in the portal system 120. Thus, if the form is presented to the same user at a later time, the form will utilize the user's default values instead of the system default values. Each job in the repository 235 may be associated with one or more forms depending upon how much input is to be provided by the user 100. The files corresponding to each form are stored in the repository 235.

The Service Agents

As stated above, the service broker 125 controls access to the portal system 120 by a particular user 100. The service broker 125 also provides session management services for users, and acts as a gateway to the other service agents within the portal system 120. The service broker 125 dispatches user requests to an appropriate service agent with the help of the name server 225. For example, when a client requests to see files that are stored on the repository 235, the service broker 125 will first consult name server 225 to determine the location of the repository 235, and then dispatch the request to that location. If the portal system 120 is configured to include redundant service agents, then the service broker 125 will distribute requests to those service agents in a round-robin manner. Each portal system 120 will have only one name server 225 and one repository 235, but may have multiple service brokers 125.

The service broker 125 provides location transparency so that users 100 are unaware of the actual location of the back-end servers 200, 205 & 210 or the service agents within the portal system 120. Accordingly, a service agent or back-end database 200, 205 & 210 may be moved from one machine to another (possibly for performance reasons) without affecting the user's interface. The user only needs to log in to the correct service broker 125 in order to have access to all of the features of the portal system 120. This greatly simplifies the login procedure and the browser interface for a user. The service broker 125 also distributes work evenly among the service agents that support identical services. For example, if two job servers 230 provide the same services, then one service broker 125 will dispatch work in balanced amounts between them. This round-robin load balancing improves performance since two machines can process job server 230 requests in parallel. Replication of a service agent also helps ensure fault tolerance. If two different job servers 230 provide identical services and one of them is not available, then the portal system 120 will continue to operate properly, as the service broker 125 dispatches requests only to the currently operational job servers 230. Of course, if all of the job servers 230 are non-operational, then job server requests will fail.

The name server 225 offers a directory lookup and initialization service for the other service agents installed in the portal system 120. The name server 225 also manages configuration information about the installed service agents. Each portal system 120 will have only one name server 225. Accordingly, it is useful to think of a portal domain 120 as the entity managed by a single name server 225. The name server 225 stores metadata about the service agents in a Relational Database Management System (RDBMS). As part of the installation process, the portal stores the RDBMS connectivity information for the name server 225 in a file stored in the repository 235. Each service agent in the portal system 120 must contact the name server 225 to acquire its configuration information during startup. Accordingly, the name server 225 should be started before starting any of the other service agents in the portal system 120. The name server 225 also maintains a configuration administrator account, which allows an Administrator to manage configuration data about the service agents.

Figure 3:
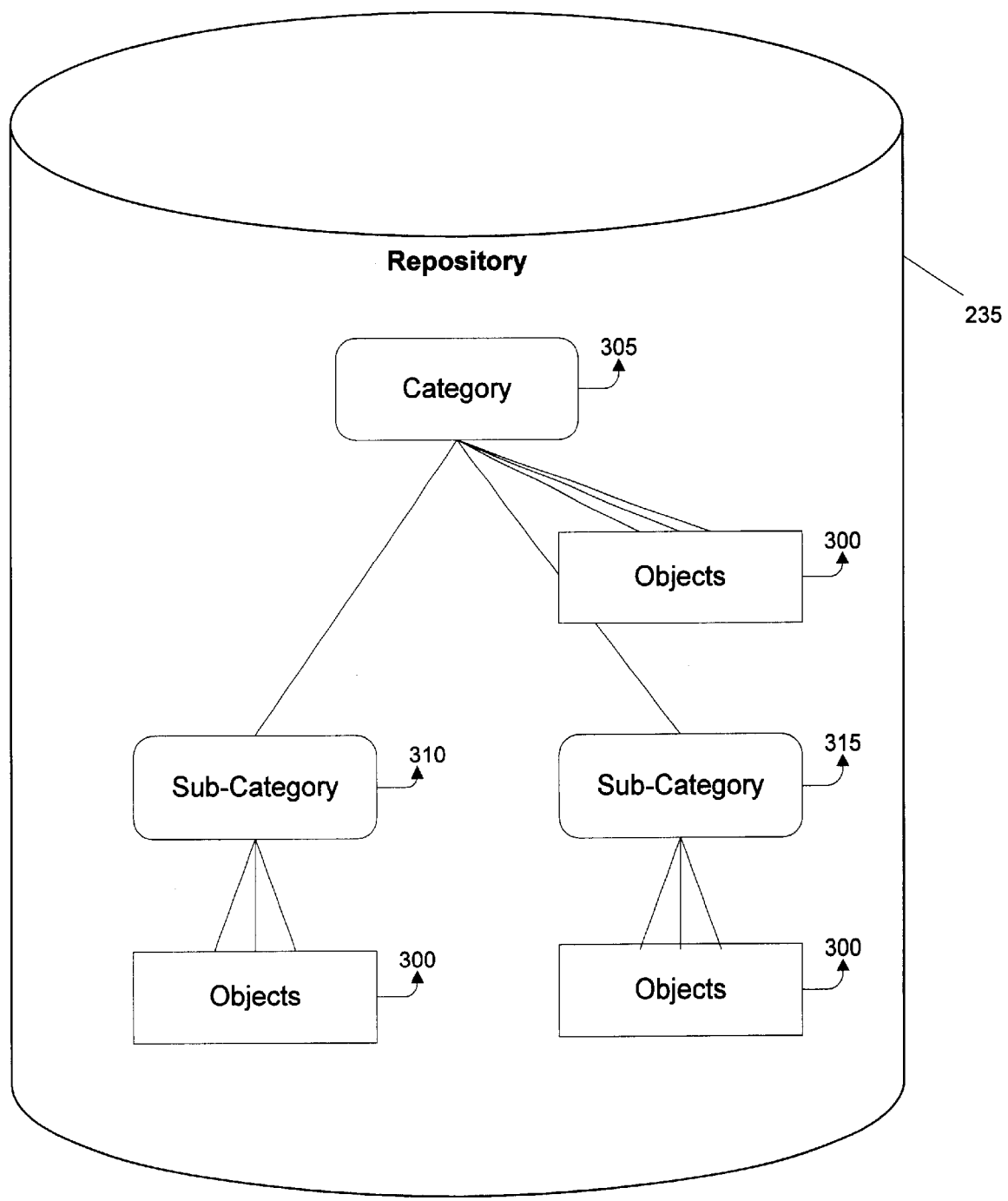
FIG. 3 depicts an example of the hierarchy of categories and objects residing in the repository.

FIG. 3 depicts a representative embodiment of the repository 235 of the portal system 120. The repository 235 is a computer memory storage device within the portal system 120. In FIG. 3, a variety of computer files, known as objects 300, are stored in the repository 235. Each of the objects 300 is assigned to a specific Category or Subcategory 305, 310, 315 within the repository 235. Categories and Subcategories 305, 310, 315 in the repository 235 are similar to file system directories or folders. Each category, subcategory, and object is defined with a set of properties. These properties include the name of the user who owns the object or category as well as permissions for the object or category. The permissions define which users can access a category or object. This is especially important if certain objects contain confidential information that only a few users should see. Accordingly, a user or administrator can structure the categories such that users can find information in an intuitive manner. The categories can also be arranged in a manner that efficiently implements security measures for sensitive data.

An object can be any kind of computer file, including the following: 1) Ordinary Files—such as text documents, spreadsheets, presentation graphics, HTML files and other documents and executables from general office applications; 2) jobs—executable program files from applications such as Brio.Report™, Oracle Reports, SAP Reports, etc.; 3) Categories—user-defined groups of objects similar to file system directories or folders; 4) External links—a file which encapsulates an Internet URL as well as metadata describing the link; and 5 channels—software 'abstracts' of searches that can be readily fine-tuned by selecting documents from current search results. Each object is assigned a property called a MIME type. A MIME type is the Multipurpose Internet Mail Extension associated with an object. Essentially, the MIME type describes the format of the data on the object. The MIME type identifies which application or job server 230 should be used to open an object. Each object placed in the repository for storage will be assigned a single MIME type.

To provide for system security an authentication server 220 is provided. The authentication server 220 is responsible for authenticating users who connect to the various service agents in the portal system 120. For example, when a user 100 logs into the portal system 120, the authentication server 220 checks the user's credentials and either allows or disallows the user to connect. In addition, the authentication server 220 identifies all of the properties and group memberships assigned to a particular user 100. Some of the properties that can be associated with a user 100 include a username, password, e-mail address, and permissions. The permissions associated with a user 100 define the ability of the user to read, write and execute objects stored in the repository 235. A Group is used to define permissions for a set of users, rather than individual users. Accordingly, all the members of a particular group will be given similar permissions for a set of objects. The authentication server 220 may be a server integrated into the portal system 120, or it may be an external system that is electrically connected to the portal system 120. An external authentication server 220 is useful when an external system already exists that defines a set of users 100, passwords, and group memberships. Communication between an external authentication server 220 and a portal system 120 may be established by using a LDAP driver.

By providing a job server 230, the portal system 120 enables a plurality of users to execute common jobs and to access the output reports of those jobs with a browser program interface. The job server 230 executes external programs, such as SQR programs, in the portal system 120. FIG. 2 illustrates that the job server 230 is electrically connected to the service broker 125, the repository 235 and at least one back-end database 200, 205 or 210. When a user 100 transmits a request to the portal system 120 to execute a particular job, the job is sent from the repository 235 to the job server 230 for execution. The job server executes the job and returns the resulting job output to the user 100. In addition, the job server 230 stores job output in the repository 235 as an object. The job server 230 can be configured to execute a variety of enterprise applications such as SQR Server and Oracle Reports. Furthermore, a plurality of job servers 230 can be installed in a portal system 120 to allow parallel execution of job requests. By storing the output reports from job servers 230 as an object in the repository 235, multiple users 100 can utilize dynamic open links to these objects within their personalized portal pages.

The event server 215 provides three services in the portal system 120: scheduling services, subscription services, and distribution/notification services. The scheduling service dispatches pre-scheduled jobs for execution by one of the job servers 230. The subscription service allows a user to subscribe to a particular job and receive job output when a job server 230 has executed the job. The distribution/notification service notifies a user when relevant events occur such as completion of a job or identification of a particular exception. The event server 215 provides three kinds of notifications to users: 1) Report Completion—a user is notified when an SQR program or other job is executed, creating a new version of the job output; a user can subscribe to either scheduled or unscheduled jobs; 2) Changed Content in a category—a user is notified when the contents of a category or subcategory changes; and 3) New Versions of an object—a user is notified when a new version of an object is stored in the repository or when an object is updated. Notifications are provided to users in a variety or ways including e-mail, a link on the user's browser interface, or an icon that appears in the user's browser interface.

Another tool for personalizing a user's portal page is the knowledge server 240, which is an optional component that adds 'search' features to the portal system 120. The knowledge server 240 provides full text searching and concept matching for documents located on Internet, intranet, and portal sites. The knowledge server 240 is configured to conduct searches upon both structured data and unstructured data. Structured data is data that is stored in a format that facilitates processing by a computer such as databases or structured filing systems like the repository 235. Unstructured data includes information that is arranged in a format designed for review by humans such as news articles, press releases, or any documents posted on the Internet to be read by humans. The knowledge server 240 can process structured and unstructured data from a variety of locations including the Internet; a company's intranet, and the portal repository 235. By using concept ranking algorithms and processes, the knowledge server 240 can qualitatively analyze structured and unstructured data and present only those items (structured or unstructured) which are most relevant to the user's search request. The documents that can be searched by the knowledge server 240 include HTML documents, Microsoft documents (such as MS Word), PDF files, text files, Brio.Query™ data files, and many others. The knowledge server 240 has two components: a search server 245 and a crawl server 250. Each portal system 120 supports a single search server 245 and a single crawl server 250 that communicate with each other. These components are interrelated and cannot function without each other.

The crawl server 250 downloads documents from Internet, intranet, and portal sites and indexes them into a database called an information source. Documents must be indexed into information sources before they can be retrieved by a search. Crawlers, which are crawl server agents, can navigate the portal, an intranet, and the Internet, according to certain predefined crawler properties. When a crawler begins executing, it starts at the first URL and downloads the document. The crawler determines whether the document should be indexed based on the crawler properties and if so, it parses the document. If the document is an HTML file, the crawler will follow hyperlinks to other documents and download them. A crawler can be configured to gather documents from multiple URLs. If it is desired to use the same crawler properties for several Web sites, then an administrator can create a single crawler to crawl these Web sites. For example, it might be desirable to use a single crawler to index a number of news sites and update the same information source, News, daily at 6:00 a.m. Conversely, if one wants to use different crawler Properties for different Web sites, then separate crawlers may be created to index the Web sites.

The crawl server shall be running in order for the crawlers to execute. If the crawl server is shut down, then all crawlers that are in progress will stop and crawlers scheduled in the future will not execute. Crawlers that are run interactively do not interfere with crawlers that are running based on a schedule. Hence, it is possible (though not useful) to run a crawler interactively while it is executing based on its schedule. The crawl server 250 can index sites that are accessible through proxy server or sites that require authentication. The crawl server 250 may include more than one crawler. The document references and other metadata identified by a crawler are stored in information sources. Each crawler can be configured with certain parameters to control which documents to index into information sources.

The search server 245 manages full text searching of documents that have been indexed into information sources by the crawl server 250. In one embodiment, the search server uses a proprietary search engine which is commercially available. The search server 245 may be configured to perform searches constructed by a user on an ad-hoc basis or to perform searches on a predefined schedule. These search results, particularly those of scheduled predefined searches, may be presented to the user on his or her personalized portal page or though portal objects.

More than one information source may be configured in the portal. If there is a reasonable partitioning of the data on the repository 235, it may be desirable to maintain multiple information sources corresponding to each of these partitions. Indexing documents into separate information sources can help users 100 narrow searches to a particular information source to get more precise results. When structuring a search, choosing to use only information sources that contain useful information can eliminate extraneous documents. The best number of information sources to be searched will depend on how much precision and flexibility the user wants in constructing his searches. Too many information sources will clutter the interface and may lead a user to simply select all information sources, negating the purpose of having separated them. An administrator can set information sources to remove old documents after a specified amount of time, or move them into a different information source.

The portal system 120 provides channels through which data can be dynamically provided to the user's personal portal pages or dashboards. The portal system 120 allows a user 100 to organize content from the search server's information sources and the repository 235 in channels. A channel is a vehicle for organizing search results. A user can create and maintain channels for private use. For example, a user might search the company intranet and the Internet about the fishing industry in the Pacific Rim, then create a private channel called Fishing: Pacific Rim that will contain the query options specified in the search. Fishing: Pacific Rim will then appear on the left frame of this user's Personal tab and each time the user clicks on Pacific Rim, the web client runs the search and surfaces the results for that channel. Should the user 100 want to, she can retrain the channel to surface only results about fishing in Vietnam and call the retrained channel Fishing: Vietnam. Users 100 with write permissions to a category can publish a channel that will reside in that category. Users 100 must have read permissions to the channels they are publishing. For example, a user 100 who is a sales manager can publish an HR Forms channel in a sales category to which she has write permission.

The Properties of the Portal System

The characteristics and settings of the portal system 120 are defined by using Properties. Properties describe the characteristics and parameters of the service agents, jobs, schedules, and objects stored in the repository 235. The properties associated with each of these items are stored in a Relational Database. The Relational Database is administered by a Relational Database Management System (RDBMS). The properties associated with the different aspects of the portal system 120 are described below.

An executable program and its associated files stored in the repository 235 are known as a job. A typical example of a job is any kind report program, including SQR programs and other report applications. A job includes all of the information needed by a properly configured job server 230 to execute a specific report or program. There are two kinds of jobs which may be processed by the portal system 120: SQR jobs and non-SQR jobs. An SQR job is a report or program that is written in Structured Query Language along with its associated files. A non-SQR job uses an application other than SQR such as Brio.Report™. Such a job comprises the report or program to be executed (for example, an Oracle report or a Crystal report), the script, batch file, or executable used to run the report or program, and any associated files (for example, GIF files, Include files, and so on). An SQR job may be either secure or nonsecure. A SQR program is secure if it uses the SECURITY command.

Figure 4:
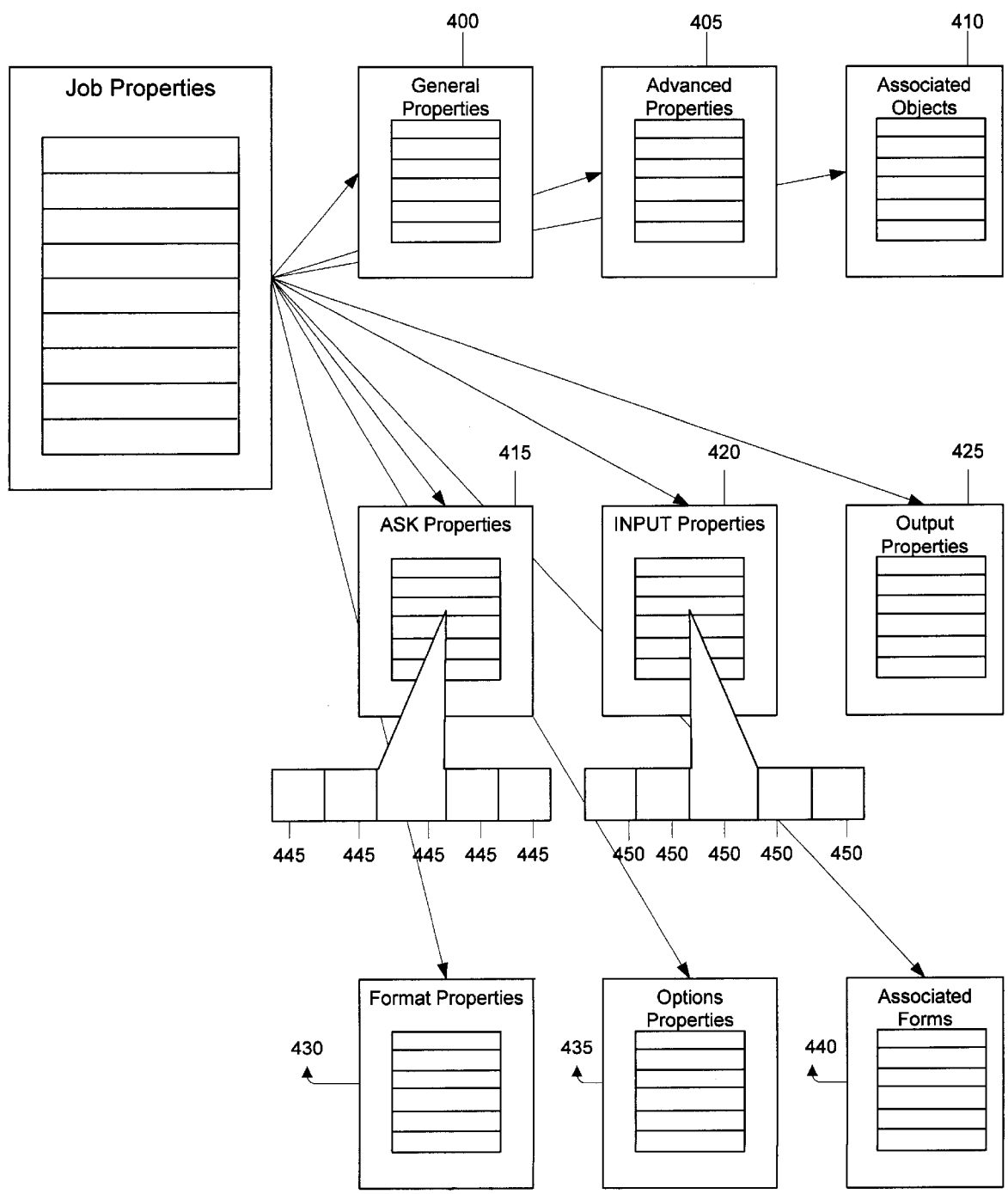
FIG. 4 depicts some of the categories of properties associated with jobs stored in the repository.

FIG. 4 depicts the hierarchical arrangement of the properties associated with a job. The properties associated with each job are stored in a relational database including the following groups: General Properties 400, Advanced Properties 405, Associated Object 410, ASK Properties 415, INPUT Properties 420, Output Properties 425, Format Properties 430, Options Properties 435, and Associated Forms 440. The General Properties 400 associated with a job include the name of the job, a brief description of what the job does, a user 100 who is identified as the owner of the job, an expiration date for the job, an auto-delete flag, the group to which the job has been assigned, and the keywords associated with the job. The user 100 that is identified as the owner of the job will generally have fall permissions to edit and delete the job. The expiration date property is used to automatically delete the job after a specified period of time. The group property gives members of the assigned group permissions to access or modify the job. The keywords are used to make the job easier to find by a user 100 using the search feature of the portal.

The Advanced Properties 405 associated with a job include the MIME type, the security mode flag, the rating of the job, a browsable flag, an exception flag, a background mode flag, a prompt-for-database-login flag, and permissions. The MIME type property indicates which program is used to open the job. The security mode flag indicates whether the job has been configured as a secure SQR job. The rating indicates whether the priority of the job output is Normal or High. The browsable flag indicates whether a user 100 can see the job by using the browser user interface. The exception flag indicates whether the job can report Exceptions. Exceptions are conditions that appear in the output of a job that require some intervention or threshold to monitor. Users 100 have the option to subscribe to an exception associated with a job. If a user 100 subscribes to an exception, then he/she will be notified, by e-mail or the exceptions dashboard, when an exception occurs during the processing of the job. The background mode flag indicates that the job is to be executed in the background, thus allowing a user 100 to perform other tasks while waiting for the job to complete. The prompt-for-database-login flag indicates that the user 100 will be prompted for a back-end database username and password when the job is executed.

Lastly, the permissions indicate the kind of access to be given to the owner, the assigned group, or any other user 100.

The Associated Objects properties 410 identify a list of objects or files which are needed by the job to be executed correctly. The Associated Objects include files required by the job at compile time, files required by the job at run time, and files required by the job when generating report output formats.

The ASK Properties 415 are used only for SQR jobs. These properties are used to prompt a user 100 to provide input at the time that a job is compiled. The ASK Properties can be provided to the job in several different ways: user input, command-line arguments, or entries in an associated ASK file. An ASK property may include either static parameters or dynamic parameters. With a static parameter, the web client form contains a blank field where the user either types in a value or accepts the default. With a dynamic parameter, the web client form contains a drop-down list of values obtained from the back-end database. The user 100 chooses one of these values by using the browser program. Each ASK property will have several fields 445 including a prompt to be provided to the user, the default value of the input parameter, the name of a table to be used for a dynamic parameter, and a column name.

The INPUT Properties 420 are used to provide input to a job when it is executed. An INPUT property may include text-field parameters, static-choice parameters or dynamic-choice parameters. For text-field parameters, the web client form presents a text entry field with a default value. The user 100 may either type in a new value or accept the default entry. For a static-choice parameter, the web client form presents, at the time of job execution, a drop-down list, or a group of radio buttons showing a selection of values that has been assigned by the owner of the job. For a dynamic-choice parameter, the web client form presents, at the time of job execution, a drop-down list, or a group of radio buttons showing a selection of values obtained from the back-end database. The user 100 chooses one of these values at the time of job execution by using the browser program. Each INPUT property will have several fields 450 including a prompt to be provided to the user, the type of input to be provided, and the default value of the input parameter.

The Output Properties 425 define the parameters which are to be associated with the output files generated by a job. Some of these parameters include an output-file displayable flag, an auto-delete flag, a propagate permissions flag, and permissions. The output-file displayable flag indicates whether the web client can display the content of an HTML output file instead of merely display a link to it. The auto-delete flag indicates whether the output file is to be automatically deleted after a pre-determined period of time. The propagate permissions flag indicates whether the same permissions set for the job should be assigned to the output file. The permissions define the ability of certain users to access, edit or delete the output file.

The Format Properties 430 define the format for the SQR job output. Format options include Hewlett Packard laser jet printer (.hp), line printer (.lp), postscript (.ps), comma-separated value (.csv), Adobe Acrobat (.pdf), and Brio-.Query™ data (.bqd). HTML output is always generated. If the job is a secure SQR job, then only HTML output type is available.

The Options Properties 435 define run-time parameters associated with a job. The options properties 435 include the username and password needed to run the job, the command-line flags for the job, the application needed to run the job, and a compile flag indicating whether the job is to be compiled immediately or at a later time.

The Form Properties 440 define the Forms which are used during run-time to collect input for the job. A form can consist of a simple HTML page that contains a form, or it can be a complex HTML page that invokes JavaScript or an applet. The form can also be a customized Web-based parameter collection form that has been developed by the enterprise for use in its jobs. When a form has been associated with a particular job, the form is stored in the repository 235. A user 100 can assign a form from the file system, or one that is already in the repository. Alternatively, a user 100 can choose to have the web client automatically generate a default Form. The form properties 440 include an HTML Parameter Collection Form, a list of Files Required by the HTML Form, a Show Parameter List when Running the job flag, and a Save As My Defaults flag. The HTML Parameter Collection Form describes the name of the form to be assigned to a particular job. The list of Files Required by the HTML Form describes the supporting files, such as GIF images, used by the form for data collection. The Show Parameter List when Running the job flag is used to enable a drop-down list of existing parameter lists when the user 100 is preparing to execute the job. The Save As My Defaults flag is used to indicate that a checkbox should be provided to the user 100 when the job executes asking him/her if the input settings should be saved as default values.

Figure 5:
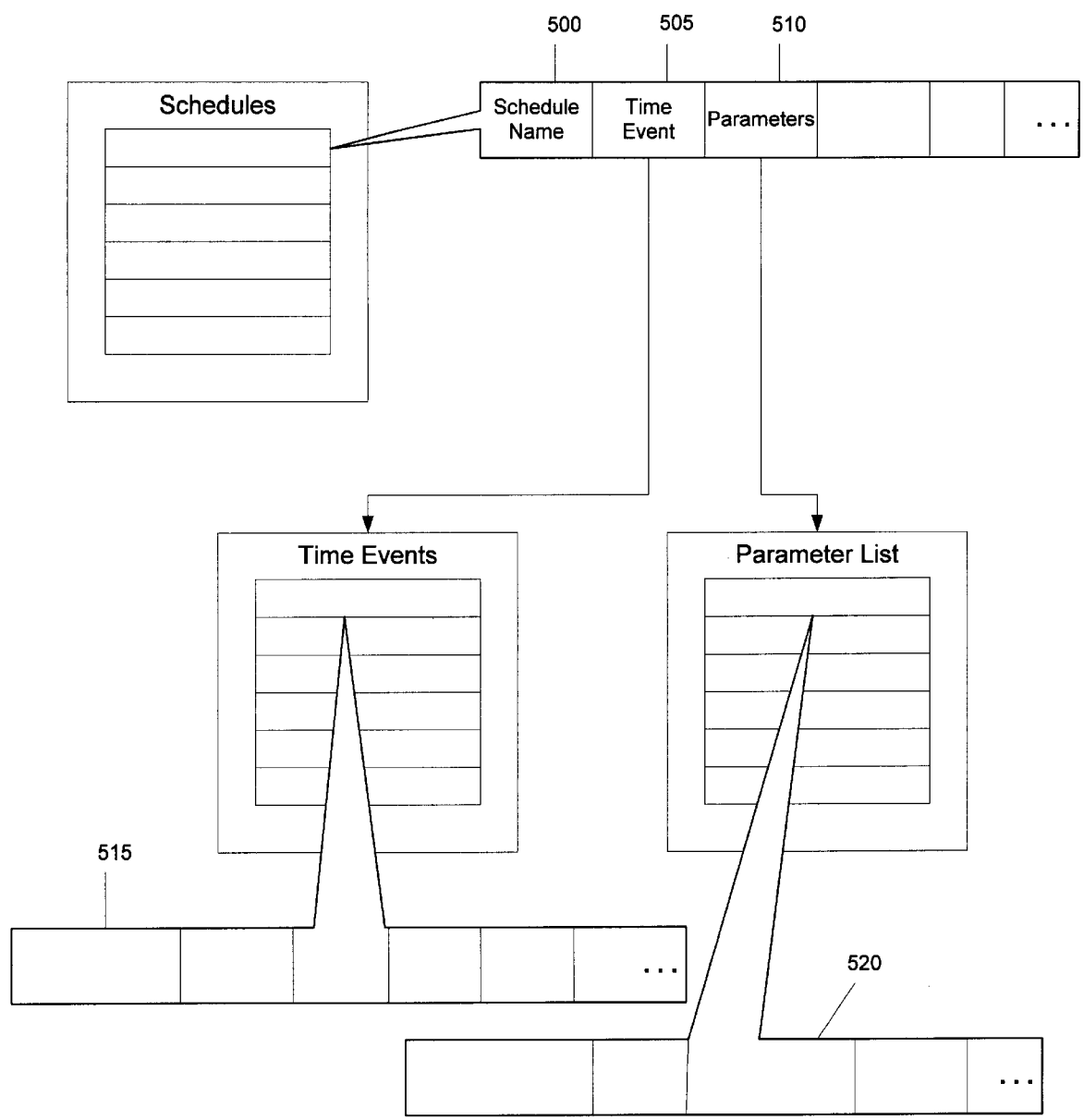
FIG. 5 depicts some of the properties associated with schedules residing in the event server.

FIG. 5 illustrates the properties associated with a schedule stored in the event server. Jobs that are created in the portal system 120 can be set up to run on a predetermined schedule. To schedule a job, it must be associated with a Time Event 505, a Parameter List 515, and a Schedule 500. Time events 505 define the timetable for running a job. Because time events are not necessarily associated with a particular job, a user 100 can utilize each time event 505 to schedule multiple jobs. Typically, several standard time events 505 will be present in the portal system 120. This allows a user 100 to select a time event 505 which best matches his needs. Each time event 505 will have several properties 515 associated with it including a brief description, a creation date, an owner, a group, permissions, a start date and time, and a repeat interval. Parameter lists 510 define the compile-time and run-time values necessary to execute a job. Each Parameter List 510 will have several properties 520 associated with it including: a parameter list name, a brief description, a job name, ASK Properties 415, INPUT Properties 420, an assigned owner and group, and permissions. Many of these properties are interrelated to the job properties illustrated in FIG. 4 and previously discussed.

Figure 6:
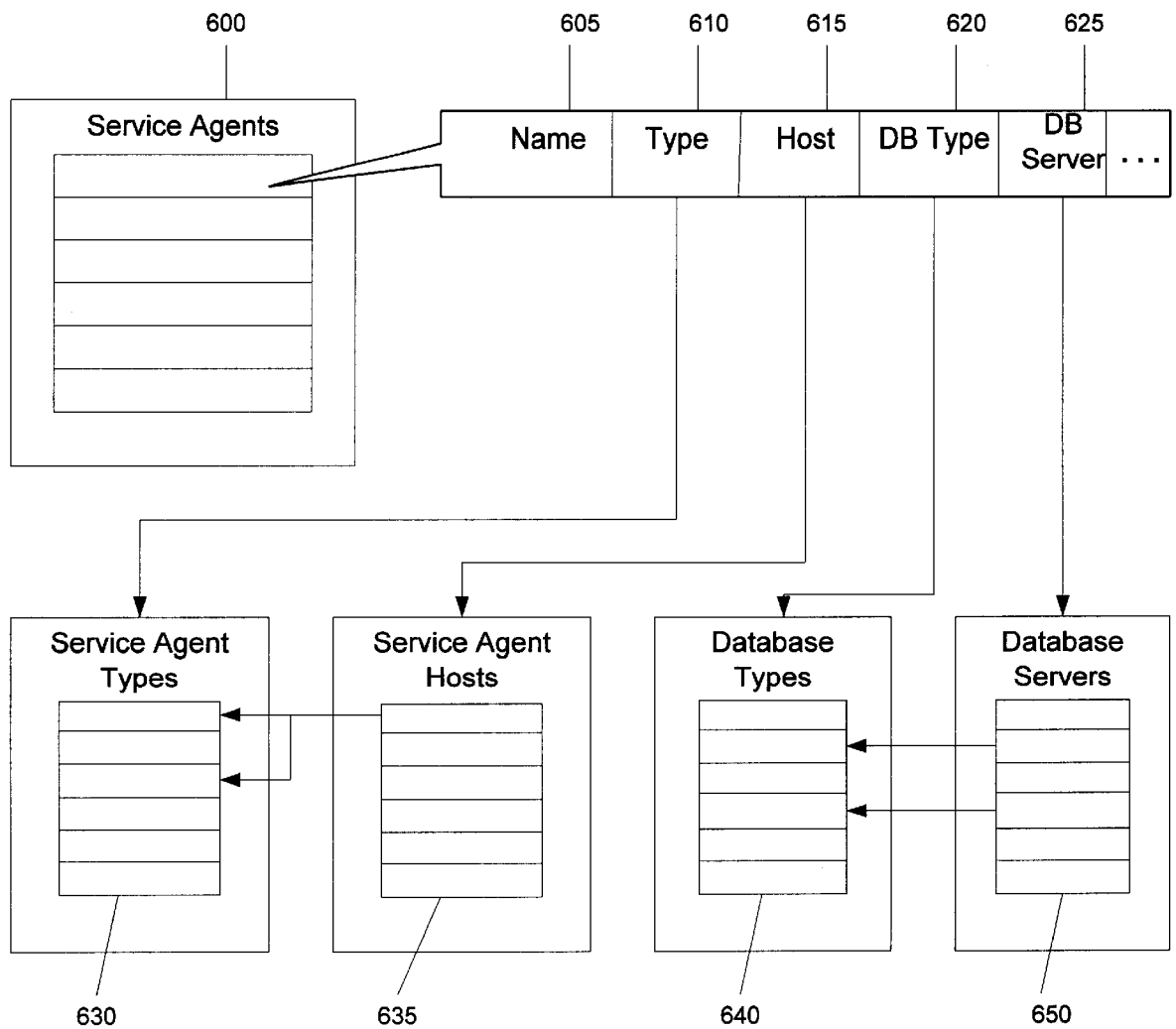
FIG. 6 depicts some of the properties associated with each service agent residing in the portal.

FIG. 6 illustrates some of the common properties associated with service agents in the portal system 120. In FIG. 6, a list of installed service agents 600 is maintained in the Relational Database in the portal system 120. Several properties are associated with each of the installed service agents, including the Name of the service agent 605, the Type of the service agent 610, the Host where the service agent resides 615, the Database Type 620 associated with service agent, and the Database Server 625 associated with the service agent. As seen in FIG. 6, a list of the different service agent types 630 is maintained in the Relational Database in the portal system 120. Thus, when a service agent is installed on the portal system 120, the administrator must add a new service agent type or select from the list of available service agent Types 630. Also depicted in FIG. 6 is a list of the available service agent Hosts 635 which are resident on the portal system 120. Again, when a new service agent is installed on the portal system 120, the administrator must add a new service agent Host or select from the list of available service agent Hosts 635. More than one service agent type can be installed on a particular service agent host. For example, an authentication server 220 and a name server 225 may both be installed the same host computer. FIG. 6 also illustrates that each service agent will be assigned a Database Type 620 and a Database Server 625. A list of the available Database Types 640 and Database Server Types 650 are maintained in the Relational Database in the portal system 120. Generally, only one Database Type 620 will be associated with a Database Server 625.

Figure 8:
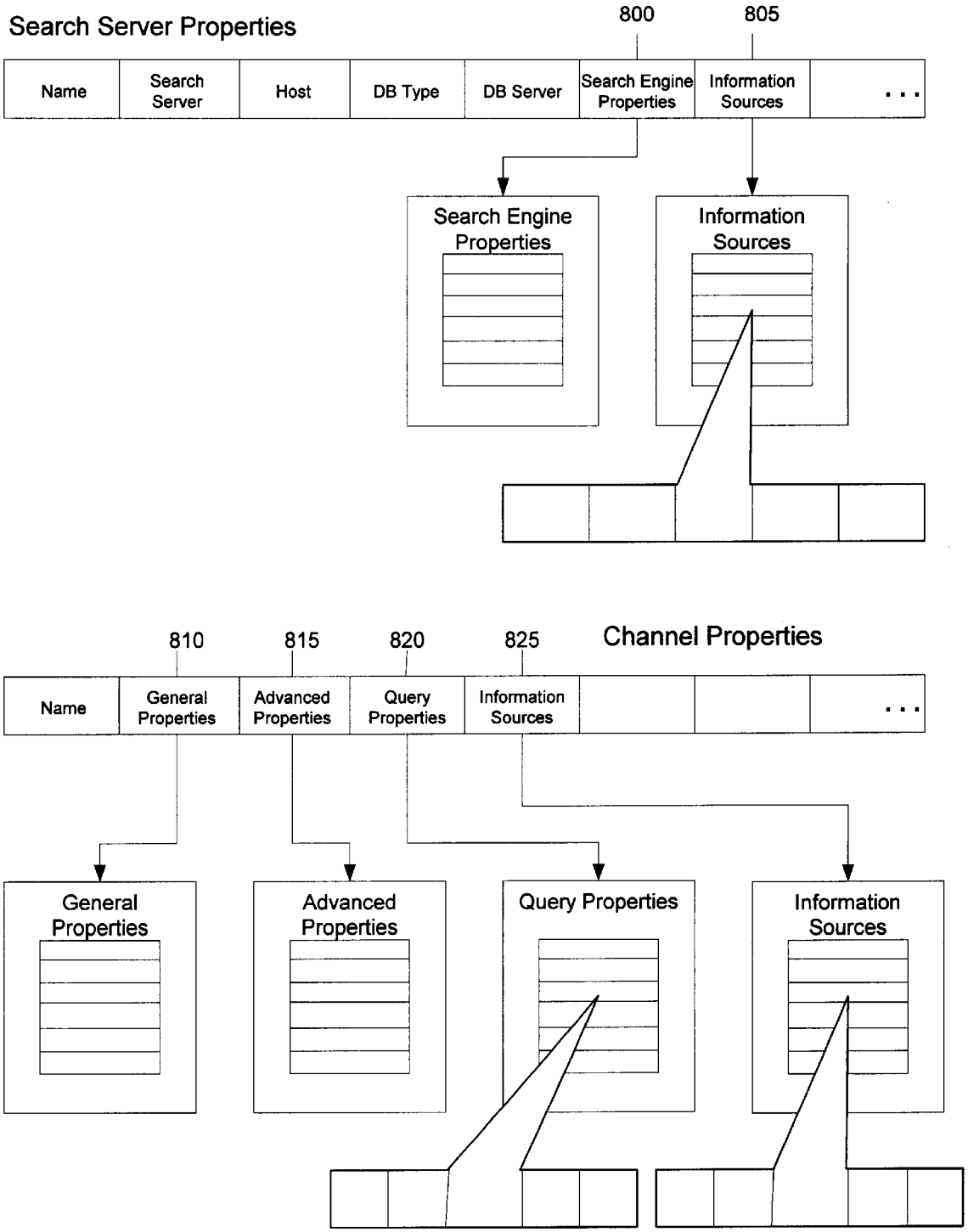
FIG. 8 depicts some of the properties associated with a search server and a channel residing in the portal.

FIGS. 7 and 8 depict some of the properties associated with the specific service agents of the portal system 120. Each repository 235 is assigned certain properties 700 including a name, a host, a database type, and a database server. Each authentication server 220 is also be assigned certain properties 705 including a name, a host, a database type, a database server, a list of supported capabilities 710, and a table of drivers 715. The capabilities 710 define whether the authentication server 220 may be used to create and modify users and groups for the portal system 120. The table of drivers 715 defines the authentication drivers which may be utilized to authenticate users such as LDAP.

Each job server 230 is assigned certain properties which are illustrated in FIG. 7. As with all other service agents, each job server 230 is assigned a name, host, database type, and database sever. In addition, each job server 230 is also assigned an Application 720, a Program 725, a job server Class 730, and a SQR Server 735 if the job server will be used for SQL jobs. The Application 720 is typically a third-party vendor application designed to run in the background. Application examples include Brio Technologies SQR, Oracle Reports, or public domain application shells such as PERL. A Program 725 is typically a source used to drive a specific invocation of an application. For example, a user 100 might submit an SQR program that generates a sales report to an SQR application on a given host through a job server 230. The Job Server Class 730 property identifies what kind of job server is installed and the SQR Server 735 defines what kind of SQR Server is installed (i.e. SQR V4.3 for Sun/Solaris/ORACLE). Each of the Application 720, Program 725, job server 730 and SQR Server 735 properties will have certain sub-properties assigned as well.

The search server 245 is assigned certain properties which are illustrated in FIG. 8. As with all other service agents, the search server 245 is assigned a name, host, database type, and database server. In addition, each job server 230 is also assigned Search Engine Properties 800 and Information Sources 805. The Search Engine Properties 800 describe the operating parameters for the search engine, including a Query Port value, an Index Port value, a Language, an Index Hyphenated Words flag, and Hyphen Character. The Query Port value identifies that port which will handle simultaneous queries from a user. The Index Port value identifies the port which receives indexing requests from the crawl server. The Language specifies the language in which month names and abbreviations of month names appear. The Index Hyphenated Words flag indicates whether the Search Engine indexes a hyphenated word as well as individual words. The Information Sources properties 805 describe the names and properties of each Information Source that has been indexed by the crawl server. Some of the properties include a Name, a Description, a Number of Documents which may be stored in the Information Source, an Expiration Date, and an Expiration Action for the Information Source.

Each channel is assigned certain properties which are illustrated in FIG. 8. Some of these properties include a set of General Properties 810, Advanced Properties 815, Query Properties 820, and Information Sources 825. The General Properties 810 define the name of the channel, a brief description, the owner and group of the channel, and the expiration date of the channel. The Advanced Properties 815 for each channel include a Browsable flag and Permissions. The Browsable flag indicates whether the channel is visible to the user 100 using the Browser interface. The Query Properties 820 define the query to be provided by the channel to the search server. These properties include the Query Phrase, the minimum relevancy for the search, the document types to be identified, a test to determine if the query had been modified in the past, a test to determine if any exception items are present, a test to determine if any high priority documents are present, and a delete training history flag. Also included are settings determining how search results should be sorted (i.e. by relevancy or last-modified date) and a display document summary flag. The Information Sources 825 associated with a channel define which information sources will be searched when a particular channel is executed.

Figure 9:
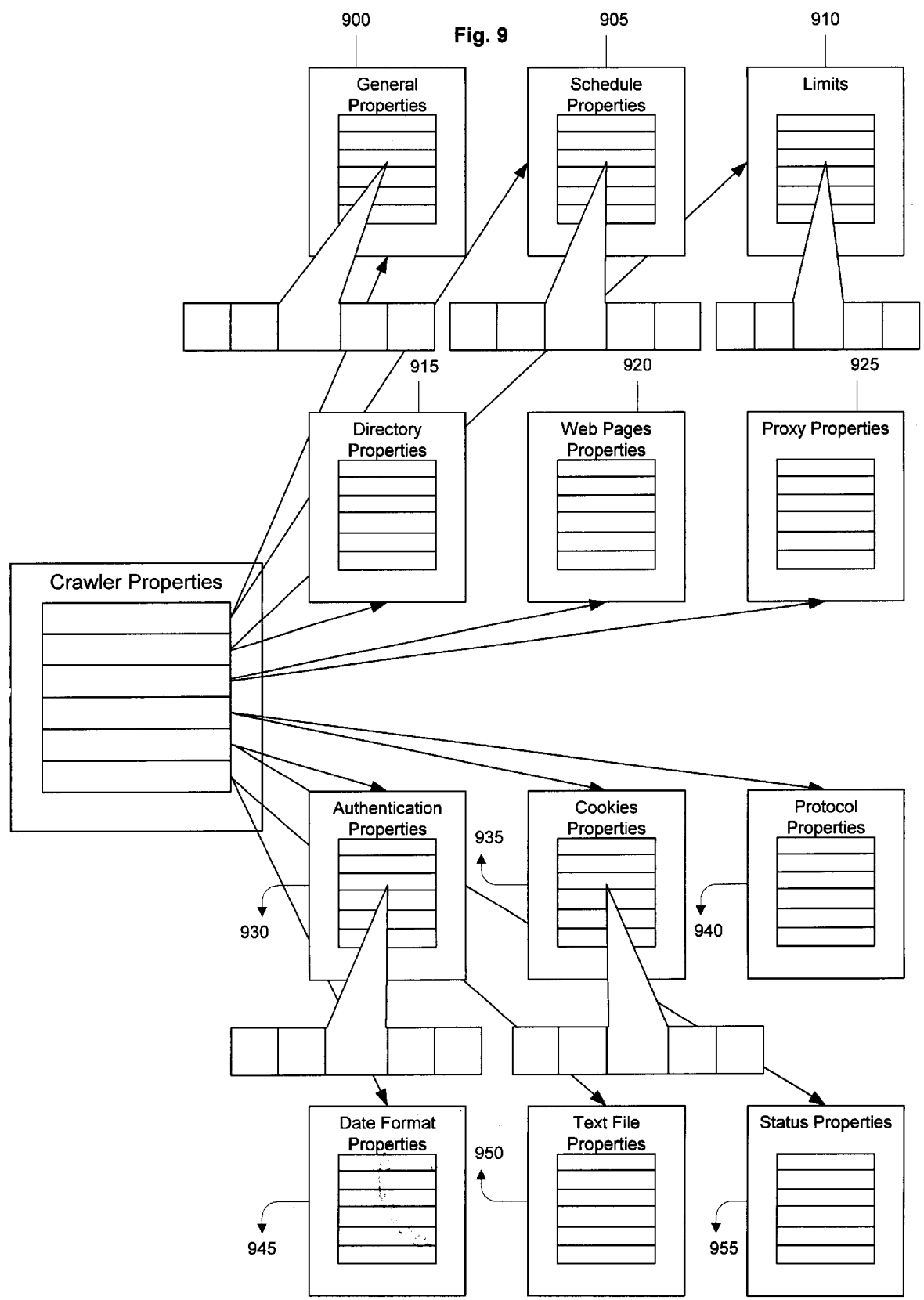
FIG. 9 depicts some of the categories of properties associated with a crawler residing in the knowledge server of the portal.

FIG. 9 depicts certain properties that are assigned to each crawler in the crawl server 250. These properties include General Properties 900, Schedule Properties 905, Limits 910, Directory Properties 915, Web Pages Properties 920, Proxy Properties 925, Authentication Properties 930, Cookies Properties 935, Protocol Properties 940, Date Format Properties 945, Text File Properties 950, and Status Properties 955. Each of these sets of properties is described below.

The General Properties 900 define the basic parameters to be used by each crawler in conducting its search. Included in these parameters are the name of the crawler, the information sources to be searched by the crawler, a list of the URLs to crawl, a flag indicating whether the URLs are case sensitive, and a flag indicating whether the crawler should follow links to other sites.

The Schedule Properties 905 are used to define the schedule on which the crawler operates. Included within the Schedule Properties 905 are a schedule (as disclosed in FIG. 5), a start time, and a repeat interval.

The Limits 910 are used to prevent the crawler from infinitely indexing sites which have deep links. Some of the limits which may be defined for a crawler include a maximum depth (which specifies how many levels of links a crawler may follow), a site duration (which defines the number of hours a crawler should spend on any given site), a page delay (which defines the number of seconds the crawler should wait after downloading a page before moving to the next link of set of links), and a page timeout (which defines the number of seconds that the crawler will wait to receive data after requesting a page).

The Directory Properties 915 provide an Allowed field and a Disallowed field. The allowed field defines a set of strings that must exist in a URL object for that object to be indexed. The disallowed field defines a set of strings that must not be in the URL object in order for the object to be indexed. These fields may be used to greatly limit the number of sites which are indexed in an information source.

Web Pages Properties 920 are used to exclude HTML and text files from being indexed in an information source based upon the content of the document and/or header. Using these properties, a user can specify those strings that must exist and/or those strings that must not exist. If either of these constraints are not met, then the HTML document will not be indexed. For example, if a user does not want any HTML or text files to be indexed that contain the phrase "living abroad," the term "living abroad" is added as a Cannot Have Text string. Or, if a user desires to index only all the HTML or text files that contain the phrase "electronic filing," then the term "electronic filing" would be added as a Must Have Text string. HTML or text files must meet both constraints in order to be indexed in an information source. If a document meets both the Must Have constraint and the Can't Have constraint, then the Can't Have constraint takes precedence and the document will not be indexed. Accordingly, the web pages properties will include two fields: a Must Have Text field and a Cannot Have Text field. Other parameters may also be set to look for these strings in the headers or content only.

Proxy Properties 925 are used to define the proxy parameters if the portal is connected to the Internet through a proxy server. The Proxy Properties 925 include the host address of the proxy server, the port on which the proxy server listens, and the user name and password for connecting to the proxy server.

The Authentication Properties 930 define how the crawler is to log into websites that require a login. Three different types of login authentication methods are available: HTTP authentication, forms-based authentication, and cookie-based authentication. Sites that display a dialog window requesting a user name and password are generally using http authentication. A user name and password usually have to be provided so that the crawler can log into the website. Sites that have a page containing a login form are usually forms-based authentication. These are fairly difficult to configure because there are many entries that can be defined on the form. Additional login information may need to be specified in the cookie tab. Accordingly, the Authentication Properties 930 will indicate which authentication protocol should be used for a site as well as user names and passwords necessary for logging in.

Cookies Properties 935 are used to specify additional login information as well as cookies that should be sent to a webserver. The additional login information allows the crawler to log into a site in which a form requires more than just a user name and password. For example, if the form has an input field that specifies a user's age, then age can be specified as additional login information. Therefore, the field's name and value should be added to the cookie as additional login information. Often a form-based login will result in a cookie being submitted to a user's browser interface. The cookie contains information about the user's login parameters insuring that the user and only that user see the content on that website. The cookies properties 935 allows cookie-based login, or cookie spoofing. Using this method, a crawler can sometimes leap frog the login process all together and insure that the crawler appears logged in as soon as it arrives at the site. Once the names and values of the cookies have been determined, they may be added to the cookies page of the crawler, thus allowing the crawler to login when it starts. Of course, if the cookie expires then cookie-based authentication will work for only the duration that the cookie is valid.

The Protocol Properties 940 allow an administrator to specify the HTTP protocol version as either 1.1 or 1.0. An administrator is also allowed to specify whether secure sockets layer (SSL) is to be used in retrieving "https://" URLs.

The Date Format Properties 945 define the specific date format and language to use when displaying search results with the web client. Some of the date formats which may be utilized are listed below in table 1.

TABLE 1

| | |
|---|---|
| YYYY - | Year as 4 digits; 1999, 2000 |
| MM - | Month as a numeric two digit number; 01, 12 |
| SHORTMONTH - | Abbreviation for the month; Jan, Sep |
| LONGMONTH - | Long month format; January, September |
| DD - | Day as a two-digit number; 08, 31 |
| D+ - | Day as either a one or two digit number; 8, 31 |
| HH - | Hour as a two-digit number; 01, 10 |
| H - | Hour as either a one- or two-digit number; 1, 10 |
| NN - | Minute as a two-digit number |
| N+ - | Minute as either a one- or two-digit number |
| SS - | Second as a two-digit number |
| S+ - | Second as either a one- or two-digit number |
| ZZZ - | Time Zone; GMT, EST, PST |

The Text File Properties 950 specify what extensions to treat as text files; for example, TXT, CSV, XML, and so on. Entering these extensions in the text file properties screen means that if the crawler finds a file with one of these extensions, it will treat the extension as a text file. MS and PDF files will automatically be treated as text files.

The Status Properties 955 displays information on how the crawler is currently performing. Some of the parameters identified as status properties include the number of seconds that the crawler has been running since the start of the current run, the number of pages that the crawler has downloaded since the start of the current run, the number of URLs that return error 404, and the number of pages that the crawler does not have authorization to access. The Status Properties 955 allow an administrator to display the status of the last run, to put the crawler on hold, and to test the crawler. The scheduled crawler state provides the crawler statistics regarding the last time that the crawler executed based on its schedule. If the crawler is currently executing, these statistics will be displayed. It does not provide statistics when the crawler was executed interactively. When a crawler is placed on hold, the crawler will not be allowed to execute based on its schedule. However, the hold will not affect the ability to run the crawler interactively. A crawler should be tested after creating it to verify it behaves as desired. By checking the logging information, and administrator or user 100 can see what documents are being downloaded and discarded. When testing a crawler, the documents are not indexed into information sources.

The Portal Page

FIG. 10 depicts a representative example of a portal page 1000 as seen from a user's browser program. A portal page 1000 is a customized web page that presents data from the portal system 120 that is most relevant to a particular user. A portal page 1000 is a user's primary interface to the data, reports and jobs that are resident in the portal system 120. Each of the sets of data that are presented to a user at the portal page 1000 is called a portal object. A portal page 1000 presents portal objects to a user 100 in a format that is readable by a standard browser program. The user's default portal page 1000 is the first page he sees after logging into the portal system 120. The first time a user logs into the portal system 120, a portal page 1000 is automatically generated. Thereafter, a user 100 can modify his respective copy of the portal page 1000, and can create additional ones. Users can modify the content, layout, and colors of any of their portal pages 1000, as well as changing which portal page 1000 is the default page (the one that displays at the beginning of a portal session). Users to whom permission is granted can publish their own portal pages for others to copy. Users can add additional components to any of their portal pages 1000, or remove optional components. In addition to using pre-configured content provided by the administrator, a user can create and include on his portal page 1000 other content of interest to him, such as bookmarks, channels, and job output files displayed as portal objects.

In FIG. 10, the portal objects are generally arranged in three columns. The left-most column 1001 is entitled "Personal" and contains a set of links which may be selected by the user with the browser program. These links allow the user to access certain "favorite" and "my" objects which have been previously defined. The middle column 1002 includes four tabs at the top entitled "personalize," "content," "layout," and "edit." These tabs are used to customize the appearance of the user's personal portal page. Below these tabs are four portal objects entitled Broadcast Messages 1005, Company Billboard 1010, My Bookmarks 1015, and the Exceptions Dashboard 1020. The right-most column 1003 includes one display window 1025, and another portal object entitled E-commerce Top Stories 1030. Each of these portal objects is described below.

In FIG. 10, the Broadcast Messages portal object 1005 is configured as a mandatory portal object. Thus, it cannot be modified or removed by a user 100. Accordingly, the Broadcast Message portal object in FIG. 10 does not include an "X" icon 1008 in the upper right hand corner which would allow a user to delete this portal object from their portal page 1000. Beneath the Broadcast Message portal object 1005, is the Company Billboard portal object 1010. The Company Billboard portal object 1010 is a preconfigured category which includes a list of links which may be accessed, but not edited by the user 100. By clicking on one of these links, a corresponding object will be displayed in the display window 1025 on the right-hand side of the portal page 1000. In the example of FIG. 10, the Personal Dashboard link in the Broadcast Messages category 1005 has been selected by a user; thus causing the Personal Dashboard portal object to be displayed in the display window 1025 of the portal page 1000. Because the Company Billboard 1010 has been set up as a preconfigured category, a user 100 cannot edit the links which are listed in this window. A user 100 does have the option of removing this portal object from his personalized portal page by selecting the "X" icon 1008 in the upper right hand corner of the Company Billboard portal object.

Below the Company Billboard 1010 is the My Bookmarks portal object 1015. The My Bookmarks portal object 1015 is set up as a standard component which means that a user 100 has the ability to modify this portal object to include the content that he desires. Within the My Bookmarks object are links to other objects within the repository 235 or to other sites on the Internet which the user 100 deems to be relevant. New bookmarks may be added to this category by the user 100 by pressing the "New Bookmark" link at the bottom of the My Bookmarks portal object 1010. In addition, a user 100 can edit the bookmarks residing in this portal object by pressing the "Edit" button located at the top right-hand corner of the My Bookmarks portal object 1010. Pressing the "Edit" button in the My Bookmarks portal object will cause an interactive form to be displayed in the display window 1025, thus allowing the user 100 to edit the content of the portal object. A user can also delete the My Bookmarks window from the personalized portal page 1000 by selecting the "X" icon 1008 in the upper right hand corner of window.

The last window displayed in the middle column of the portal page 1000 is the Exceptions Dashboard 1020. The exceptions dashboard 1020 is set up as a standard component which may be edited and configured by a user. The exception dashboard 1020 is used to indicate when an exception condition has been found in a particular job processed in the portal system 120. An exception condition is tied to the results of a job executed within the portal system 120. Only certain jobs within the portal system 120 can be configured to indicate an exception condition. In addition, a user 100 is required to subscribe to an exception associated with a job before he can be notified of the exception condition via his portal page 1000. The exception dashboard window 1020 can be configured by a user to display an indicator when an exception condition is met by a particular job that was processed by the portal system 120. In FIG. 10, the exception dashboard is configured to display a traffic light which is green when no exceptions are present and red when an exception condition was indicated by a job.

The right-most column of the portal page 1000 of FIG. 10 includes a display window 1025 and another portal object entitled E-commerce Top Stories 1030. The display window 1025 is used to display the objects and reports requested by a user 100 during a session. Generally, the requested objects must be in a format that is capable of being read by a browser program in order to be displayed in a the display window 1025. In FIG. 10, the personal dashboard portal object is being displayed in the display window 1025.

The portal object illustrated at the bottom of the right-most column 1003 of the portal page 1000 is a syndicated content portal object entitled E-commerce Top Stories 1030. A syndicated content portal object is used to present dynamically updated content provided by a third party. Third party content could include information such as a news-wire, a stock quote service, or a sports score reporting service. In FIG. 10, the third party content that is provided in this window is a news-wire service related to E-commerce stories.

The personal dashboard is an object that can be personalized and configured by a user to display a variety of objects from the portal system 120 as well as content obtained from the Internet. For example, in FIG. 10, the user 100 has configured his personal dashboard to display two image bookmarks: the "Just-In-Time Sales Report" 1035 and the "Operations Dashboard" 1040, a chart entitled "Sales by Product Analysis" 1045, a set of current weather information 1050, and a continuously updating banner describing other information 1060. The two image bookmarks are links to other objects which may be displayed in the display window 1025. Thus, by clicking on either of these icons, a corresponding object would then be displayed in the display window 1025. The "Sales by Product Analysis" chart 1045 is a dynamically updated portal object that displays the results of a job that was recently executed by the portal. Every time that the corresponding job is executed, an output file would be generated which would then be displayed on the user's personal dashboard. Thus, by merely displaying the personal dashboard, a user may view an image of the most recent sales by product analysis, or any other job report. This portal object may also be configured as an image bookmark so that a larger image of the graph will be displayed by clicking through. The set of current weather information 1050 indicates that the personal dashboard may be configured to display information from the Internet as well as objects from the portal. Lastly, the continuously updating banner describing other information 1060 illustrates that any data may be configured to be displayed on the personal dashboard as long it is readable by a standard web browser. Thus, the personal dashboard can display a variety of structured and unstructured data in a standardized format.

The Portal Processes

The login process for a user can be described by referencing FIG. 2. A user 100 can be connected to the portal system 120 by accessing a computer which is connected to the portal's network server 105. Initially, the user 100 sends a request to the network server 105 for access to the portal system 120. The user 100 is then prompted to provide a username and password for the portal system 120. This information is then passed from the web client 115, to the service broker 125 to the authentication server 220. At the authentication server, if the user 100 is identified as a valid user, then a session token is sent to the service broker 125 which grants the user 100 access to the portal system 120 for a period of time. If no activity is detected by the service broker 125 for a certain period of time, then the user's session is closed and he will be forced to log in again. Information about the user's group affiliation and system permissions are also stored in the authentication server 220. Thus, the authentication server 220 determines what level of access to be given a user 100 based upon his permissions. For example, a user 100 may only be given permission to view certain categories or objects in the repository 235. All other categories and objects in the repository are off-limits to the user. The service broker 215 would therefore bar the user from accessing any "off-limits" objects and categories and would only allow him to access permitted areas within the portal system 120.

After a user 100 logs in to the system, he will first be presented with his personalized portal page 1000 on his browser software. The process by which this is accomplished is described below. After a session is established at the service broker 125 of the portal system 120, the service broker retrieves a set of metadata corresponding to the user's personal portal page 1000 from the repository. This metadata indicates which portal objects should also be retrieved from the repository 235 in order to populate the portal page 1000. After all of the portal objects have been retrieved from the repository, they are assembled into a format which can be read by a browser program. After this, the personalized portal page 1000 is transmitted to the appropriate user 100 through the network server 105. At the user's interface, his browser program will display the personalized portal page 1000 to the user. The process of assembling a personalized portal page 1000 is repeated every time a user 100 refreshes his browser screen. Because each portal page 1000 is assembled on an ad-hoc basis using the most current versions of the portal objects in the repository 235, the data presented on a newly refreshed portal page 1000 will present the most recent data available in the portal system 1000.

A user 100 may select jobs to be processed by the portal system 120 by performing the following steps. First, a user will select a link or object on his personalized portal page 1000 which corresponds to a job. For example, in FIG. 10, a user 100 may select the first link in the company billboard portal object 1010. Or, a user 100 may select the "Just-in-Time Sales Report" image bookmark 1035 in the personal dashboard. Either of these selections will transmit a request to the portal system 120 to execute a job and return the results to the user 100. Referring again to FIG. 2, when the request to execute a job is received by the service broker 125, it is first determined if the user has permissions to execute this job. This is done by polling the authentication server 220 to create a user context for the job. The user context will include the user's username, group information, default category, and default permissions. If the user 100 is found to have appropriate permissions for the job, then the job will be retrieved from the repository 235 and sent to the service broker 125. The service broker will then dispatch the job (along with the user context) to an appropriate job server 230 for processing. Generally, the job will be dispatched asynchronously so that the service broker 125 is freed up to perform other tasks while the job is executing. It should be noted that a job will often include several objects necessary for the execution of the program other than the executable file. These objects may include metadata corresponding to the job, forms objects, and INPUT objects. The job server 230 uses all of these objects to execute the job request.

A job may require a fresh set of data to be retrieved from a back-end database 200, 205, or 210. If this is the situation, then the job will be dispatched to a job server 230 that is connected to an appropriate back-end database. After the data is retrieved from a back-end database, it is processed by the job server 230 and an output report is prepared. In many instances, the output report will have to be transformed into a format that is appropriate for storage and/or presentation to the user. This process is performed by the job server 230. After the output reports have been converted into the appropriate format, then the job server analyzes the job metadata to determine if there are any subscriptions or notifications which need to be fulfilled. The job server 230 will also test the output report to determine if any exception conditions are present. The job server 230 utilizes the job metadata to determine if any of the exception conditions have been met. If so, appropriate notifications will be sent to the subscribing users via e-mail or portal object update (such as notification on a dynamic portal object). In addition, the job server 230 will assign user and group permissions to the output report. These permissions define the users and groups that can access and view the output report. The output report will then be transmitted to the service broker 125 so that it can be forwarded to the user who requested it. The output report will generally be displayed in the display window 1025 of the user's personalized portal page. A copy of the output report may also be stored in the repository 235.

Another condition that may be encountered by the job server 230 during the execution of a job is the requirement of input for the job. In some instances, the input can be provided by an INPUT object associated with the job in the repository (see item 420 of FIG. 4). In other instances, the input must be provided by the user 100 as the job executes. In this situation, an ASK form associated with the job will be used to solicit input from the user 100. When a job server 230 requires input, an ASK form will be transmitted to the service broker 125 by the job server 230. The ASK form will then be presented to the user 100 at the user's browser interface. If a job requires input from a user, and there is no corresponding ASK form, then the portal system 120 may construct an ad-hoc input form which can be presented to the user. After the user 100 has made his input selections on the form, the input data is transmitted to the job server 230 through the service broker 125. The input data is then utilized by the job server 230 to complete the execution of the job.

Another feature of the portal system is the creation of secure bursted output reports. These output reports contain embedded permission markings which restrict the ability of some users and groups to view some portions of an output report. Thus, when a user with limited permissions views a secure bursted output report, he will see only those sections which he has been given permission to see. The secure bursted output report feature works best when the output report has been bursted into multiple files with each file containing one or more HTML pages. When an output report is created in the job server, each file is tagged with a set of user and group permissions defining the ability of certain users and groups to access all of the HTML pages in the file. A master file containing a plurality of containers is also generated. Each container is used as a reference to one of the bursted files. Thus, by assembling all of the bursted files into the master file, a complete output report may be generated. Accordingly, an output report with multiple containers, each of which having different levels of permissions, yields the most flexibility.

To retrieve a secure bursted output report from the repository, the user must first have logged into the portal system 120. The process of logging into the portal establishes a user context which contains, among other things, the username, user permissions and group information. After a user is logged in, the portal system 120 uses the following steps to determine which parts of a bursted secure job output to provide to a user. First, when a user requests a secure bursted output report, the normal permission checking is done to determine if the user has the appropriate permissions to read the master output report. If the user does not have appropriate permissions, then an error message is returned to the user and the retrieval process is ended. Second, the repository checks the permissions for each container in the master output report. If the user has appropriate permissions for the container, then the special tags that were assigned to each file when the output was created are checked. If the user name is in the list in the tags or the user is a member of one of the groups listed in the tags, then this container is added to the set of containers to be returned as part of the master output report. If the user does not have appropriate permissions, then the container is not added to the set of containers to return. No errors are returned from this step. The fact that a user cannot see a particular container is not necessarily an error but a function of the way the secure bursted output program operates. After this process is finished and a list of viewable containers in the secure bursted output report is determined, the contents of each approved container are retrieved from the repository and are presented to the user.

In the event server 215, jobs may be associated with certain time events. These time events control when jobs run. Jobs which can be associated with time events include batch jobs that are to be processed in the job servers, searches to be conducted in the knowledge server, or retrieving channels from the repository for processing in the knowledge server. When the event server 215 starts, it builds an ordered list of time events that are known to the system. The time events are ordered by the next time that they are scheduled to run. Each time event may have one or more jobs scheduled against it. The job information includes data about the job properties and distribution/notification information. The data necessary to build this list is retrieved from the database that contains the event server 215 metadata. Once the ordered list is generated, the event server 215 calculates the amount of time until the first time event is scheduled to run and goes to sleep for this amount of time.

The following steps are performed when the event server 215 awakens and collects the set of jobs associated with the time event scheduled to run at that time. These actions are performed for each scheduled job. First, the event server 215 sends a transaction to the repository 235 to retrieve a job that is to be run. If the job is no longer in the repository 235, then the event server 235 will remove the scheduled job from the event server 235 metadata and move on to the next scheduled job. Second, the event server 235 sends a transaction to the authentication server 220 to get information about the user 100 that scheduled the job. That information includes the username, group information, default folder and default permissions. This information is used to create a user context. This user context is used when sending the job to the appropriate job server 230 for execution. The event server 235 will make it appear that the user 100 that scheduled the job is the user 100 that is running the job through the scheduler. Third, the event server 235 sets the parameter values for the job with the parameter values that were input by the user 100 when the job was scheduled. This would include both ASK and INPUT values for SQR jobs and input values for generic jobs. Fourth, the event server 235 sends the job to the service broker 125. The service broker 125 will route the job to an appropriate job server 230 for execution. The command that is used to send the job to the job server 230, via the service broker 125, is a command that will cause the job to run asynchronously. The command also contains distribution information that allows the job server 230 to distribute output reports and send e-mail notifications when the job is completed. When a job runs asynchronously in the job server 230, a unique thread is created to run the job and control returns to the event server 215. This mechanism allows the event server 235 to send numerous scheduled jobs to the service broker 125 for execution without waiting for previous jobs to finish. The event server 235 supports a user configurable concept called retry processing. If the event server 235 fails to send the job to the job server 230, one of two things happens. If retry processing has been disabled, an error notification will be sent to the e-mail address specified when the job was scheduled. No attempt will be made rerun the job. If retry processing is enabled, then an e-mail will be sent informing the user that the job could not be sent to the job server 230 and it is being resubmitted. The job is then added to a retry queue so the event server 235 can try to run it later. Fifth, when control is returned to the event server 235, the metadata for the scheduled job is updated to reflect the time it was run and the number of times it has run is incremented.

Jobs that are placed in the retry queue are retried using the following algorithm. Each job will be retried until they run successfully or until the event server 235 is stopped. When a job is retried, it follows the five steps outlined above. When a job is first placed in the retry queue it is set to run 10 minutes after the time it is placed in the queue. After each attempt to run the job, if it fails, it is resubmitted to the retry queue with an additional 10-minute wait time added until the next retry. In other words, jobs submitted to the retry queue will be retried first in 10 minutes, then 20 minutes, then 30 minutes, etc. all the way up to 120 minutes. After the retry period hits 120 minutes it stays there. Thus, if a job that is retried after 120 minutes and fails, it will be retried in another 120 minutes. The 120-minute maximum delay is user configurable.

When the event server 235 is first started, a sweeper thread is started that looks through the metadata about time events and scheduled jobs. The sweeper thread looks for scheduled jobs that should have run in the past but didn't. This would include jobs that were queued up or in the retry queue when the event server 235 was stopped. When such a job is found it is retried using the five steps described above.

Although the portal system has been described in this specification by way of description, examples and drawings, it should be noted that various changes and modifications may be apparent to those skilled in the art. In particular, many modifications in the structure and operation of the hardware and software may be made in the implementation of the embodiments described above. Any such changes and modifications should be construed as being included within the scope of the inventors' original conception, unless they depart from the scope of the invention as defined by the claims.

What is claimed is:

1. A computer system configured to search for structured and unstructured data objects, the computer system connected to a network interface that may be connected to at least one user through a computer network; the computer system comprising:
   a service broker electrically connected to the network interface, the service broker adapted to control a level of access to the computer system by a user;
   a repository electrically connected to the service broker, the repository comprising a computer memory encoded with a plurality of objects including structured data objects and unstructured data objects;
   a knowledge server electrically connected to the service broker and to the repository, the knowledge server comprising: i) a computer memory encoded with at least one information source comprising a searchable index describing at least one set of structured and unstructured data objects; ii) a crawl server configured to manage at least one crawler, wherein said at least one crawler is configured to process a set of structured and unstructured data objects and generate a searchable index describing the set of objects, and wherein said at least one crawler is configured to store the searchable index in a corresponding information source; and iii) a search server configured to process a search request so as to generate a search result, wherein the search request comprises at least one query term, a corresponding set of search properties, and a list identifying at least one information source to be searched, and wherein the search result comprises a list of objects identified during the search.

2. A computer system according to claim 1, wherein at least one user is electrically connected to the network interface through a computer network.

3. A computer system according to claim 2, wherein the knowledge server is configured to receive a search request from said at least one user and to provide a corresponding search result to said at least one user.

4. A computer system according to claim 1, wherein the set of structured and unstructured data objects includes data objects outside the computer system.

5. A computer system according to claim 4, wherein the set of structured and unstructured data objects includes data objects on the Internet.

6. A computer system according to claim 1, wherein the knowledge server further comprises:
   a computer memory encoded with a first information source comprising a searchable index corresponding to a plurality of sets of structured and unstructured data objects;
   a crawl server configured to manage a plurality of crawlers, wherein each of said crawlers is configured to process a unique set of structured and unstructured data objects and generate a searchable index describing the unique set of objects, and wherein each of said crawlers is configured to store the generated searchable index in the first information source.

7. A computer system configured to search for structured and unstructured data objects, the computer system connected to a network interface that may be connected to at least one user through a computer network; the computer system comprising:
   a service broker electrically connected to the network interface, the service broker adapted to control a level of access to the computer system by a user;
   a repository electrically connected to the service broker, the repository comprising a computer memory encoded with a plurality of objects including structured data objects and unstructured data objects;
   a knowledge server electrically connected to the service broker and to the repository, the knowledge server comprising: i) a computer memory encoded with at least one information source comprising a searchable index describing at least one set of structured and unstructured data objects; ii) a crawl server configured to manage at least one crawler, wherein said at least one crawler is configured to process a set of structured and unstructured data objects and generate a searchable index describing the set of objects, and wherein said at least one crawler is configured to store the searchable index in a corresponding information source; and iii) a search server configured to process a search request so as to generate a search result, wherein the search request comprises at least one query term, a corresponding set of search properties, and a list identifying at least one information source to be searched, and wherein the search result comprises a list of objects identified during the search;
   wherein the set of search properties includes a relevancy property defining a minimum relevancy score that an object must have to be included in the corresponding search result, a document type property defining a document type that an object must be to be included in the corresponding search result, and a date modified property defining a date beyond which an object must have been modified to be included in the corresponding search result;
   wherein the computer memory of the knowledge server is further encoded with at least one set of crawler properties corresponding to one of said at least one crawlers, each set of crawler properties including:
   a name of a corresponding crawler;
   a list of URLs to be processed by the corresponding crawler;
   a set of limits defining a number of links to follow beyond a starting URL;
   a first set of constraints defining terms which must be included in an object in order for it to be indexed by the corresponding crawler;
   a second set of constraints defining terms which must not be included in an object in order for it to be indexed by the corresponding crawler;
   a set of authentication properties providing access to secure objects in said set of structured and unstructured data objects by the corresponding crawler; and
   a schedule defining a time when the corresponding crawler is to begin execution.

8. A computer system according to claim 7, wherein at least one user is electrically connected to the network interface through a computer network.

9. A computer system according to claim 8, wherein the knowledge server is configured to receive a search request from said at least one user and to provide a corresponding search result to said at least one user.

10. A computer system according to claim 8, wherein the set of structured and unstructured data objects includes data objects outside the computer system.

11. A computer system according to claim 10, wherein the set of structured and unstructured data objects includes data objects on the Internet.

12. A computer system according to claim 10, wherein the knowledge server further comprises:

a computer memory encoded with a first information source comprising a searchable index corresponding to a plurality of sets of structured and unstructured data objects;

a crawl server configured to manage a plurality of crawlers, wherein each of said crawlers is configured to process a unique set of structured and unstructured data objects and generate a searchable index describing the unique set of objects, and wherein each of said crawlers is configured to store the generated searchable index in the first information source.

13. A computer system configured to search for structured and unstructured data objects, the computer system connected to a network interface that may be connected to at least one user through a computer network; the computer system comprising:

a service broker electrically connected to the network interface, the service broker adapted to control a level of access to the computer system by a user;

a repository electrically connected to the service broker, the repository comprising a computer memory encoded with a plurality of objects including structured data objects, unstructured data objects, and at least one channel, wherein the channel comprises at least one query term, a corresponding set of search properties, and a list identifying at least one information source to be searched;

a knowledge server electrically connected to the service broker and to the repository, the knowledge server comprising: i) a computer memory encoded with at least one information source comprising a searchable index describing at least one set of structured and unstructured data objects; ii) a crawl server configured to manage at least one crawler, wherein said at least one crawler is configured to process a set of structured and unstructured data objects, generate a searchable index describing the set of objects, and store the searchable index in a corresponding information source; and iii) a search server configured to receive said at least one channel from the repository and process the channel with each of the information sources listed in the channel so as to generate a search result, wherein the search result comprises a list of objects identified during the search.

14. A computer system according to claim 13, wherein at least one user is electrically connected to the network interface through a computer network.

15. A computer system according to claim 14, wherein the computer system is configured to receive a request to process a channel from said at least one user and to provide a corresponding search result to said at least one user.

16. A computer system according to claim 13, wherein the set of structured and unstructured data objects includes data objects outside the computer system.

17. A computer system according to claim 16, wherein the set of structured and unstructured data objects includes data objects on the Internet.

18. A computer system according to claim 13, wherein the knowledge server further comprises:

a computer memory encoded with a first information source comprising a searchable index corresponding to a plurality of sets of structured and unstructured data objects;

a crawl server configured to manage a plurality of crawlers, wherein each of said crawlers is configured to process a unique set of structured and unstructured data objects and generate a searchable index describing the unique set of objects, and wherein each of said crawlers is configured to store the generated searchable index in the first information source.

19. A computer system configured to search for structured and unstructured data objects, the computer system connected to a network interface that may be connected to at least one user through a computer network; the computer system comprising:

a service broker electrically connected to the network interface, the service broker adapted to control a level of access to the computer system by a user;

a repository electrically connected to the service broker, the repository comprising a computer memory encoded with a plurality of objects including structured data objects, unstructured data objects, and at least one channel, wherein the channel comprises at least one query term, a corresponding set of search properties, and a list identifying at least one information source to be searched;

a knowledge server electrically connected to the service broker and to the repository, the knowledge server comprising: i) a computer memory encoded with at least one information source comprising a searchable index corresponding to at least one set of structured and unstructured data objects; ii) a crawl server configured to manage at least one crawler, wherein said at least one crawler is configured to process a set of structured and unstructured data objects, generate a searchable index describing the set of objects, and store the generated searchable index in a corresponding information source; and iii) a search server configured to receive said at least one channel from the repository and process the channel with each of the information sources listed in the channel so as to generate a search result, wherein the search result comprises a list of objects identified during the search;

wherein the set of search properties includes a relevancy property defining a minimum relevancy score that an object must have to be included in the corresponding search result, a document type property defining a document type that an object must be to be included in the corresponding search result, and a date modified property defining a date beyond which an object must have been modified to be included in the corresponding search result;

wherein the computer memory of the knowledge server is further encoded with at least one set of crawler properties corresponding to one of said at least one crawlers, each set of crawler properties including:

a name of a corresponding crawler;

a list of URLs to be processed by the corresponding crawler;

a set of limits defining a number of links to follow beyond a starting URL;

a first set of constraints defining terms which must be included in an object in order for it to be indexed by the corresponding crawler;

a second set of constraints defining terms which must not be included in an object in order for it to be indexed by the corresponding crawler;

a set of authentication properties providing access to secure objects in said set of structured and unstructured data objects by the corresponding crawler; and a schedule defining a time when the corresponding crawler is to begin execution.

20. A computer system according to claim 19, wherein at least one user is electrically connected to the network interface through a computer network.

21. A computer system according to claim 20, wherein the computer system is configured to receive a request to process a channel from said at least one user and to provide a corresponding search result to said at least one user.

22. A computer system according to claim 19, wherein the set of structured and unstructured data objects includes data objects outside the computer system.

23. A computer system according to claim 22, wherein the set of structured and unstructured data objects includes data objects on the Internet.

24. A computer system according to claim 19, wherein the knowledge server further comprises:
   a computer memory encoded with a first information source comprising a searchable index corresponding to a plurality of sets of structured and unstructured data objects;
   a crawl server configured to manage a plurality of crawlers, wherein each of said crawlers is configured to process a unique set of structured and unstructured data objects and generate a searchable index describing the unique set of objects, and wherein each of said crawlers is configured to store the generated searchable index in the first information source.

25. A computer system according to claim 19, further comprising:
   an event server electrically connected to the service broker, the event server comprising a computer memory encoded with instructions for dispatching a channel for processing in the knowledge server according to a predefined schedule.

26. A method of conducting a search in a computer system comprising a service broker, a repository, and a knowledge server, wherein the knowledge server comprises a computer memory including at least one information source, a crawl server configured to manage at least one crawler, and a search server, the method comprising:
   associating said at least one crawler with a set of structured and unstructured data;
   assigning a set of crawler properties to said at least one crawler, wherein the set of crawler properties defines how said at least one crawler will process data objects;
   executing the crawler with said set of crawler properties and said set of structured and unstructured data so as to generate index data corresponding to said set of structured and unstructured data;
   storing the generated index data in a corresponding information source in the computer memory of the knowledge server;
   receiving a search request comprising at least one query term, a corresponding set of search properties, and a list identifying at least one information source to be searched; and
   processing the search request with each of the listed information sources so as to generate a search result comprising a list of objects identified during the search.

27. A method according to claim 26, further comprising:
   receiving a request for access to the computer system by a user connected to the network interface through a computer network;
   providing a level of access to the user based upon information stored in an authentication server;
   receiving a search request from the user;
   providing the corresponding search result to the user in a format readable by a browser program.

28. A method according to claim 26, wherein the set of structured and unstructured data objects includes at least one data object that is outside the computer system, wherein the step of executing the crawler further comprises:
   retrieving a data object from outside the computer system through the network interface.

29. A method according to claim 28, wherein the set of structured and unstructured data objects includes at least one data object that is on the Internet, wherein the step of executing the crawler further comprises:
   retrieving a data object from the Internet through the network interface.

30. A method according to claim 26, wherein the crawler properties includes a schedule defining a time when a corresponding crawler is to begin execution, the method further comprising:
   executing said at least one crawler at a time defined by the schedule in the corresponding crawler properties.

31. A method of conducting a search in a computer system comprising a service broker, a repository, and a knowledge server,
   wherein the knowledge server comprises a computer memory including at least one information source, a crawl server configured to manage at least one crawler, and a search server,
   wherein the repository comprises a computer memory encoded with a plurality of objects including structured data objects, unstructured data objects, and at least one channel, wherein said at least one channel comprises at least one query term and a list identifying at least one information source to be searched, the method comprising:
   associating said at least one crawler with a set of structured and unstructured data;
   assigning a set of crawler properties to said at least one crawler, wherein the set of crawler properties defines how said at least one crawler will process data objects;
   executing the crawler with said set of crawler properties and said set of structured and unstructured data so as to generate index data corresponding to said set of structured and unstructured data;
   storing the generated index data in a corresponding information source in the computer memory of the knowledge server;
   retrieving a channel from the repository; and
   processing said at least one query term on the retrieved channel with each of the information sources listed in the channel so as to generate a search result comprising a list of objects identified during the search.

32. A method according to claim 31, further comprising:
   receiving a request for access to the computer system by a user connected to the network interface through a computer network;
   providing a level of access to the user based upon information stored in an authentication server;
   receiving a request to execute a channel from the user;
   providing the corresponding search result to the user in a format readable by a browser program.

33. A method according to claim 31, wherein the set of structured and unstructured data objects includes at least one data object that is outside the computer system, wherein the step of executing the crawler further comprises:

retrieving a data object from outside the computer system through the network interface.

34. A method according to claim 33, wherein the set of structured and unstructured data objects includes at least one data object that is on the Internet, wherein the step of executing the crawler further comprises:

retrieving a data object from the Internet through the network interface.

35. A method according to claim 31, wherein the crawler properties include a schedule defining a time when a corresponding crawler is to begin execution, the method further comprising:

executing said at least one crawler at a time defined by the schedule in the corresponding crawler properties.

36. A method of conducting a search in a computer system comprising a service broker, a repository, and a knowledge server, wherein the knowledge server comprises a computer memory including at least one information source, a crawl server configured to manage at least one crawler, and a search server, the method comprising:

associating said at least one crawler with a set of structured and unstructured data;

assigning a set of crawler properties to said at least one crawler, wherein the set of crawler properties includes a name of a corresponding crawler, a list of URLs to be processed by the corresponding crawler, and a set of limits defining a number of links to follow beyond a starting URL;

for each URL listed in the crawler properties, executing said at least one crawler to perform the following:

i) retrieving a data object corresponding to the URL;
ii) generating index data corresponding to the retrieved data object, the index data including a name of the retrieved data object, a document type corresponding to the retrieved data object, a date field corresponding to the last date on which the retrieved data object was modified, and a set of keywords associated with retrieved data object;
iii) storing the index data in a corresponding information source in the computer memory of the knowledge server;
iv) determining a number of links which have been followed since retrieving the data object corresponding to the listed URL;
v) if the number of links which have been followed is less than the number of links defined in the set of limits in the crawler properties, then performing steps a) through b);
   a) processing the retrieved data object to generate a list of hyperlinks that appear in the retrieved data object;
   b) for each hyperlink in the retrieved data object, performing the following steps aa) through dd):
      aa) retrieving a data object corresponding to the hyperlink;
      bb) generating index data corresponding to the retrieved data object, the index data including a name of the retrieved data object, a document type corresponding to the retrieved data object, a date field corresponding to the last date on which the retrieved data object was modified, and a set of keywords associated with retrieved data object;
      cc) storing the generated index data in a corresponding information source in the computer memory of the knowledge server;
      dd) recursively performing steps iv) through v) for the retrieved data object corresponding to the hyperlink;

receiving a search request comprising at least one query term, a set of search properties, and a list identifying at least one information source to be searched, wherein the set of search properties includes a relevancy property, a document type property, a date modified property, and a sorting criteria property;

for each entry in each of the information sources listed in the search request, executing the search server to perform the following steps:

vi) comparing the entry in the information source with said at least one query term so as to generate a relevancy score;
vii) if the generated relevancy score is greater than the relevancy property of the search request, then performing the following step c):
   c) if the document type property of the entry matches the document type property of the search request, then performing the following step ee):
      ee) if the date field of the entry is more recent than the date modified property of the search request, then storing the index data corresponding to the entry in a corresponding search result;

arranging the entries in the corresponding search result according to the sorting criteria property of the search request.

37. A method according to claim 36, wherein the set of crawler properties further includes: a first set of constraints defining terms which must be included in an object in order for it to be indexed by the corresponding crawler; a second set of constraints defining terms which must not be included in an object in order for it to be indexed by the corresponding crawler;

the step of generating index data corresponding to the retrieved data object further comprising:

aaa) comparing the retrieved data object to the first set of constraints and to the second set of constraints in the crawler properties corresponding to the crawler; and
bbb) if the retrieved data object complies with both of the first set of constraints and the second set of constraints, then generating index data corresponding to the retrieved data object, the index data including a name of the retrieved data object, a document type corresponding to the retrieved data object, a date field corresponding to the last date on which the retrieved data object was modified, and a set of keywords associated with retrieved data object.

38. A method according to claim 36, wherein the set of crawler properties further includes a set of authentication properties providing access to secure data objects in said set of structured and unstructured data objects by the corresponding crawler, the step of retrieving a data object corresponding to the URL further comprising:

ccc) transmitting a request to retrieve a secure data object corresponding to the URL;
ddd) receiving a request for authentication data from a server corresponding to the URL;
eee) transmitting a set of authentication properties corresponding to the crawler to the server corresponding to the URL; and
fff) retrieving a secure data object from the server corresponding to the URL.

39. A method according to claim 36, wherein the set of crawler properties further includes a schedule defining a time when the corresponding crawler is to begin execution, the step of executing said at least one crawler further comprising:

executing said at least one crawler at a time defined by the schedule in the crawler properties.

40. A method according to claim 36, further comprising:

receiving a request for access to the computer system by a user connected to the network interface through a computer network;

providing a level of access to the user based upon information stored in an authentication server;

receiving a search request from the user;

providing the corresponding search result to the user in a format readable by a browser program.

41. A method according to claim 36, wherein the set of structured and unstructured data objects includes data objects that are outside the computer system, wherein the step of retrieving a data object further comprises:

retrieving a data object from outside the computer system through the network interface.

42. A method according to claim 41, wherein the set of structured and unstructured data objects includes data objects that are on the Internet, wherein the step of retrieving a data object further comprises:

retrieving a data object from the Internet through the network interface.

43. A method of conducting a search in a computer system comprising a service broker, a repository, and a knowledge server, wherein the knowledge server comprises a computer memory encoded with at least one information source, a crawl server configured to manage at least one crawler, and a search server, wherein the repository comprises a computer memory encoded with a plurality of objects including structured data objects, unstructured data objects, and at least one channel, wherein said at least one channel comprises at least one query term, a corresponding set of search properties, and a list identifying at least one information source to be searched, and wherein the corresponding set of search properties includes a relevancy property, a document type property, a date modified property, and a sorting criteria property, the method comprising:

associating said at least one crawler with a set of structured and unstructured data;

assigning a set of crawler properties to said at least one crawler, wherein the set of crawler properties includes a name of a corresponding crawler, a list of URLs to be processed by the corresponding crawler, and a set of limits defining a number of links to follow beyond a starting URL;

for each URL listed in the crawler properties, executing said at least one crawler to perform the following:
  i) retrieving a data object corresponding to the URL;
  ii) generating index data corresponding to the retrieved data object, the index data including a name of the retrieved data object, a document type corresponding to the retrieved data object, a date field corresponding to the last date on which the retrieved data object was modified, and a set of keywords associated with retrieved data object;
  iii) storing the index data in a corresponding information source in the computer memory of the knowledge server;
  iv) determining a number of links which have been followed since retrieving the data object corresponding to the listed URL;
  v) if the number of links which have been followed is less than the number of links defined in the set of limits in the crawler properties, then performing steps a) through b);
    a) processing the retrieved data object to generate a list of hyperlinks that appear in the retrieved data object;
    b) for each hyperlink in the retrieved data object, performing the following steps aa) through dd):
      aa) retrieving a data object corresponding to the hyperlink;
      bb) generating index data corresponding to the retrieved data object, the index data including a name of the retrieved data object, a document type corresponding to the retrieved data object, a date field corresponding to the last date on which the retrieved data object was modified, and a set of keywords associated with retrieved data object;
      cc) storing the generated index data in a corresponding information source in the computer memory of the knowledge server;
      dd) recursively performing steps iv) through v) for the retrieved data object corresponding to the hyperlink;

retrieving said at least one channel from the computer memory of the repository;

for each entry in each of the information sources listed in the channel, executing the search server to perform the following steps:
  vi) comparing the entry in the information source with said at least one query term so as to generate a relevancy score;
  vii) if the generated relevancy score is greater than the relevancy property of the channel, then performing the following step c):
    c) if the document type property of the entry matches the document type property of the channel, then performing the following step ee):
      ee) if the date field of the entry is more recent than the date modified property of the channel, then storing the index data corresponding to the entry in a corresponding search result;

arranging the entries in the corresponding search result according to the sorting criteria property of the channel.

44. A method according to claim 43, wherein the set of crawler properties further includes: a first set of constraints defining terms which must be included in an object in order for it to be indexed by the corresponding crawler; a second set of constraints defining terms which must not be included in an object in order for it to be indexed by the corresponding crawler;

the step of generating index data corresponding to the retrieved data object further comprising:
  aaa) comparing the retrieved data object to the first set of constraints and to the second set of constraints in the crawler properties corresponding to the crawler; and
  bbb) if the retrieved data object complies with both of the first set of constraints and the second set of constraints, then generating index data corresponding to the retrieved data object, the index data including a name of the retrieved data object, a document type corresponding to the retrieved data object, a date field corresponding to the last date on which the retrieved data object was modified, and a set of keywords associated with retrieved data object.

45. A method according to claim 43, wherein the set of crawler properties further includes a set of authentication properties providing access to secure data objects in said set of structured and unstructured data objects by the corresponding crawler, the step of retrieving a data object corresponding to the URL further comprising:

ccc) transmitting a request to retrieve a secure data object corresponding to the URL;

ddd) receiving a request for authentication data from a server corresponding to the URL;

eee) transmitting a set of authentication properties corresponding to the crawler to the server corresponding to the URL; and fff) retrieving a secure data object from the server corresponding to the URL.

46. A method according to claim 43, wherein the set of crawler properties further includes a schedule defining a time when the corresponding crawler is to begin execution, the step of executing said at least one crawler further comprising:

executing said at least one crawler at a time defined by the schedule in the crawler properties.

47. A method according to claim 43, further comprising:

receiving a request for access to the computer system by a user connected to the network interface through a computer network;

providing a level of access to the user based upon information stored in an authentication server;

receiving a request to execute a channel from the user;

providing the corresponding search result to the user in a format readable by a browser program.

48. A method according to claim 43, wherein the set of structured and unstructured data objects includes data objects that are outside the computer system, wherein the step of retrieving a data object further comprises:

retrieving a data object from outside the computer system through the network interface.

49. A method according to claim 48, wherein the set of structured and unstructured data objects includes data objects that are on the Internet, wherein the step of retrieving a data object further comprises:

retrieving a data object from the Internet through the network interface.

* * * * *